(12) United States Patent
Hoehn et al.

(10) Patent No.: US 10,472,947 B2
(45) Date of Patent: Nov. 12, 2019

(54) DEFORMATION MEASUREMENT METHOD AND APPARATUS

(71) Applicant: Commonwealth Scientific and Industrial Research Organisation, Acton, Australian Capital Territory (AU)

(72) Inventors: Karsten Hoehn, Acton (AU); John William Arkwright, Acton (AU)

(73) Assignee: Commonwealth Scientific and Industrial Research Organisation, ACT (AU)

( * ) Notice: Subject to any disclaimer, the term of this patent is extended or adjusted under 35 U.S.C. 154(b) by 441 days.

(21) Appl. No.: 15/323,159

(22) PCT Filed: Jun. 29, 2015

(86) PCT No.: PCT/AU2015/050361
§ 371 (c)(1),
(2) Date: Dec. 30, 2016

(87) PCT Pub. No.: WO2016/000034
PCT Pub. Date: Jan. 7, 2016

(65) Prior Publication Data
US 2018/0171778 A1   Jun. 21, 2018

(30) Foreign Application Priority Data
Jun. 30, 2014   (AU) ................................ 2014902497

(51) Int. Cl.
*E21B 47/00* (2012.01)
*E21B 47/06* (2012.01)
(Continued)

(52) U.S. Cl.
CPC ........ *E21B 47/0006* (2013.01); *E21B 47/065* (2013.01); *G01B 11/165* (2013.01);
(Continued)

(58) Field of Classification Search
CPC .... E21B 47/0006; E21B 47/065; E21B 47/06; E21B 17/20; G01B 11/165; G01B 11/16;
(Continued)

(56) References Cited

U.S. PATENT DOCUMENTS 4,468,088 A * 8/1984 van der Hoek ...... G02B 6/4405
                                                              385/111
5,182,779 A * 1/1993 D'Agostino et al. .. D07B 1/145
                                                              385/13
(Continued)

FOREIGN PATENT DOCUMENTS

| | | |
|---|---|---|
| CL | 765-2011 | 4/2011 |
| DE | 199 13 113 | 10/2000 |

(Continued)

OTHER PUBLICATIONS

International Search Report for International Application No. PCT/AU2015/050361 dated Sep. 29, 2015 (3 pages).
(Continued)

*Primary Examiner* — John R Lee
(74) *Attorney, Agent, or Firm* — Merchant & Gould P.C.

(57) ABSTRACT

Apparatus for measuring deformation of an elongate body defining an axis, the apparatus including: an optical fibre arranged relative to the body, the optical fibre including a first strain sensitive optical fibre portion coupled to the body and at least partially aligned at a first angle relative to the axis, and a second strain sensitive optical fibre portion coupled to the body and at least partially aligned at a second angle relative to the axis, the second angle being opposite to the first angle; a radiation source connected to an end of the optical fibre, the radiation source being for supplying electromagnetic radiation to the optical fibre; a sensor connected to an end of the optical fibre, the sensor being for sensing electromagnetic radiation received from the first and second optical fibre portions; and a processing device for determin- (Continued)

ing the deformation of the body using the sensed electromagnetic radiation, the deformation including any axial or torsional deformation.

20 Claims, 11 Drawing Sheets

(51) Int. Cl.
*G01B 11/16* (2006.01)
*G01D 5/353* (2006.01)
*G01K 11/32* (2006.01)
*G02B 6/12* (2006.01)
*E21B 17/20* (2006.01)

(52) U.S. Cl.
CPC ..... *G01D 5/35341* (2013.01); *G01D 5/35345* (2013.01); *G01D 5/35374* (2013.01); *G01K 11/32* (2013.01); *E21B 17/20* (2013.01); *G02B 2006/12138* (2013.01)

(58) Field of Classification Search
CPC ........... G01D 5/35341; G01D 5/35345; G01D 5/35351; G01D 5/35354; G01D 5/35358; G01D 5/35361; G01D 5/35364; G01D 5/3537; G01D 5/35374; G01D 5/353; G01K 11/32; G01K 11/3206; G01K 2011/322; G01K 2011/324; G02B 2006/12138; G02B 6/00; G02B 6/02
See application file for complete search history.

(56) References Cited

U.S. PATENT DOCUMENTS

| | | | | |
|---|---|---|---|---|
| 5,825,804 A * | 10/1998 | Sai | ........................ | G01K 11/32 374/137 |
| 6,004,639 A * | 12/1999 | Quigley | ................ | B29C 70/086 428/36.3 |
| 6,256,090 B1 * | 7/2001 | Chen | ....................... | G01B 11/18 250/227.14 |
| 7,315,666 B2 | 1/2008 | Van Der Spek | | |
| 8,131,121 B2 * | 3/2012 | Huffman | ............. | G01M 5/0025 356/73.1 |
| 8,705,903 B2 * | 4/2014 | Younge | ................ | A61B 5/1076 385/13 |
| 9,677,960 B2 * | 6/2017 | Cheng | ................... | G01L 9/0027 |
| 2005/0231207 A1 * | 10/2005 | Goldwater | ............. | D02G 3/441 324/522 |
| 2006/0071158 A1 * | 4/2006 | Van Der Spek | ........ | E21B 47/01 250/227.14 |
| 2006/0233482 A1 * | 10/2006 | Rambow | ............. | E21B 47/0006 385/12 |
| 2007/0201793 A1 * | 8/2007 | Askins | .................... | G01B 11/18 385/37 |
| 2008/0047662 A1 * | 2/2008 | Dria | ..................... | E21B 47/0006 156/249 |
| 2008/0066334 A1 * | 3/2008 | David | .................... | G01B 5/207 33/755 |
| 2008/0204706 A1 * | 8/2008 | Magne | ................ | G01M 5/0025 356/32 |
| 2011/0007996 A1 | 1/2011 | Huffman | | |
| 2011/0205526 A1 | 8/2011 | Brown et al. | | |
| 2011/0228255 A1 * | 9/2011 | Li | ........................... | G01B 11/18 356/33 |
| 2011/0292384 A1 * | 12/2011 | Ramos | ................... | G01B 11/18 356/301 |
| 2012/0143525 A1 * | 6/2012 | Chen | ....................... | G01L 1/246 702/42 |
| 2013/0094798 A1 * | 4/2013 | Duncan | ............... | E21B 47/0006 385/13 |
| 2013/0222811 A1 * | 8/2013 | Handerek | .......... | G01M 11/3127 356/477 |
| 2014/0158877 A1 * | 6/2014 | Wysocki | .................. | G01V 8/02 250/269.1 |
| 2014/0345388 A1 * | 11/2014 | Den Boer | ................ | G01V 1/40 73/655 |
| 2015/0048243 A1 * | 2/2015 | Childers | ................. | B29C 71/00 250/269.1 |
| 2015/0260037 A1 * | 9/2015 | Gajji | .................... | E21B 47/0006 175/50 |
| 2015/0260567 A1 * | 9/2015 | Kuvshinov | ............ | G01H 9/004 702/56 |
| 2015/0285626 A1 * | 10/2015 | Yamauchi | .......... | G01D 5/35358 356/32 |
| 2015/0308909 A1 * | 10/2015 | Carneal | ............... | G01M 5/0025 250/206 |
| 2016/0108719 A1 * | 4/2016 | Danisch | ................... | G01C 9/00 175/57 |
| 2016/0131520 A1 * | 5/2016 | Martin | ............... | G01D 5/35361 73/597 |
| 2016/0146661 A1 * | 5/2016 | Martin | ............... | G01D 5/35361 356/482 |
| 2017/0016746 A1 * | 1/2017 | Daton-Lovett | ........ | G01D 11/30 |
| 2018/0171778 A1 * | 6/2018 | Hoehn | ............... | G01D 5/35374 |

FOREIGN PATENT DOCUMENTS

| WO | 2009/068907 A1 | 6/2009 |
|---|---|---|
| WO | 2012/137168 A2 | 10/2012 |
| WO | 2014/083989 A1 | 6/2014 |

OTHER PUBLICATIONS

International Preliminary Report on Patentability for International Application No. PCT/AU2015/050361 dated Jan. 3, 2017 (7 pages).

* cited by examiner

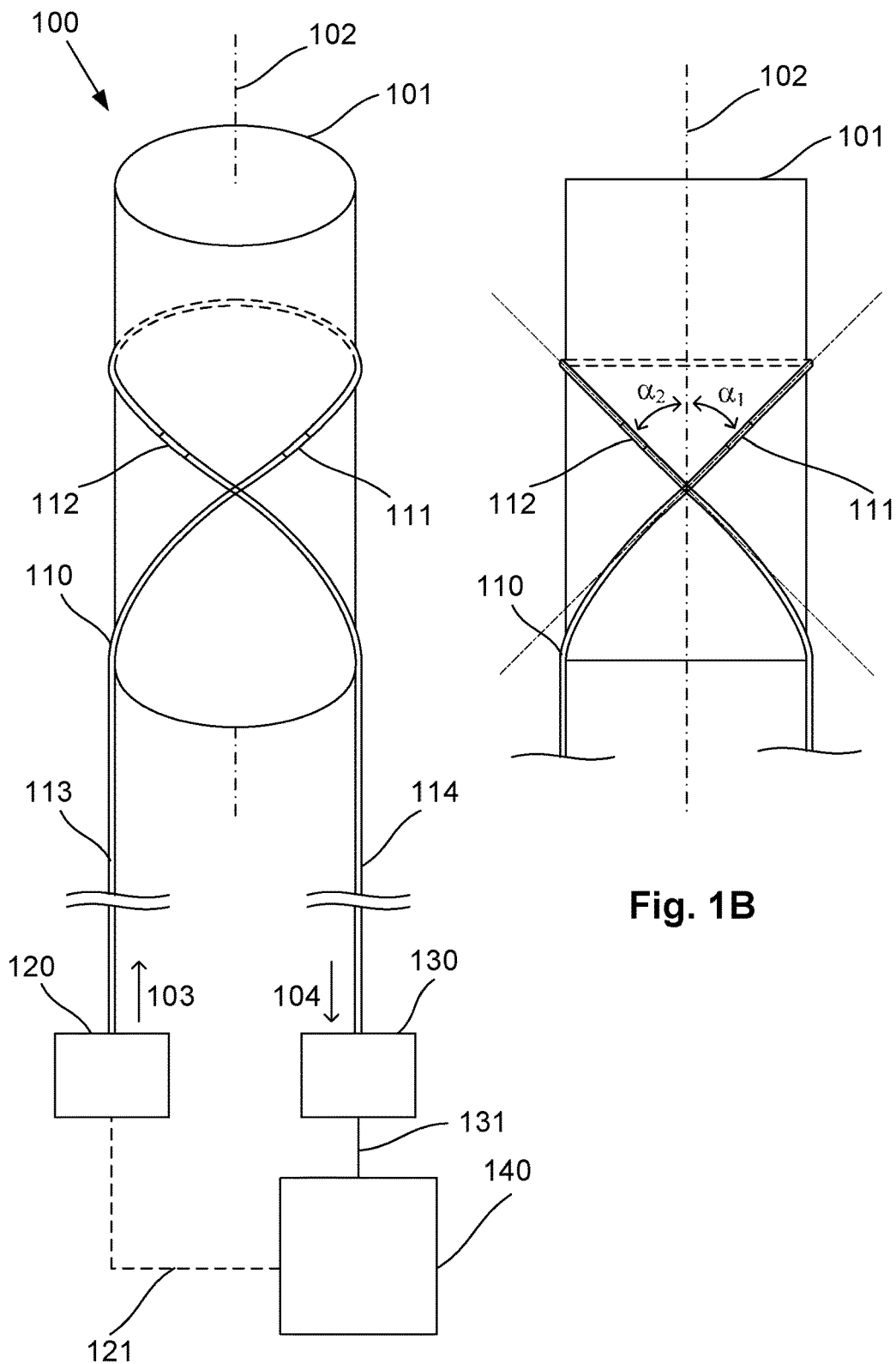

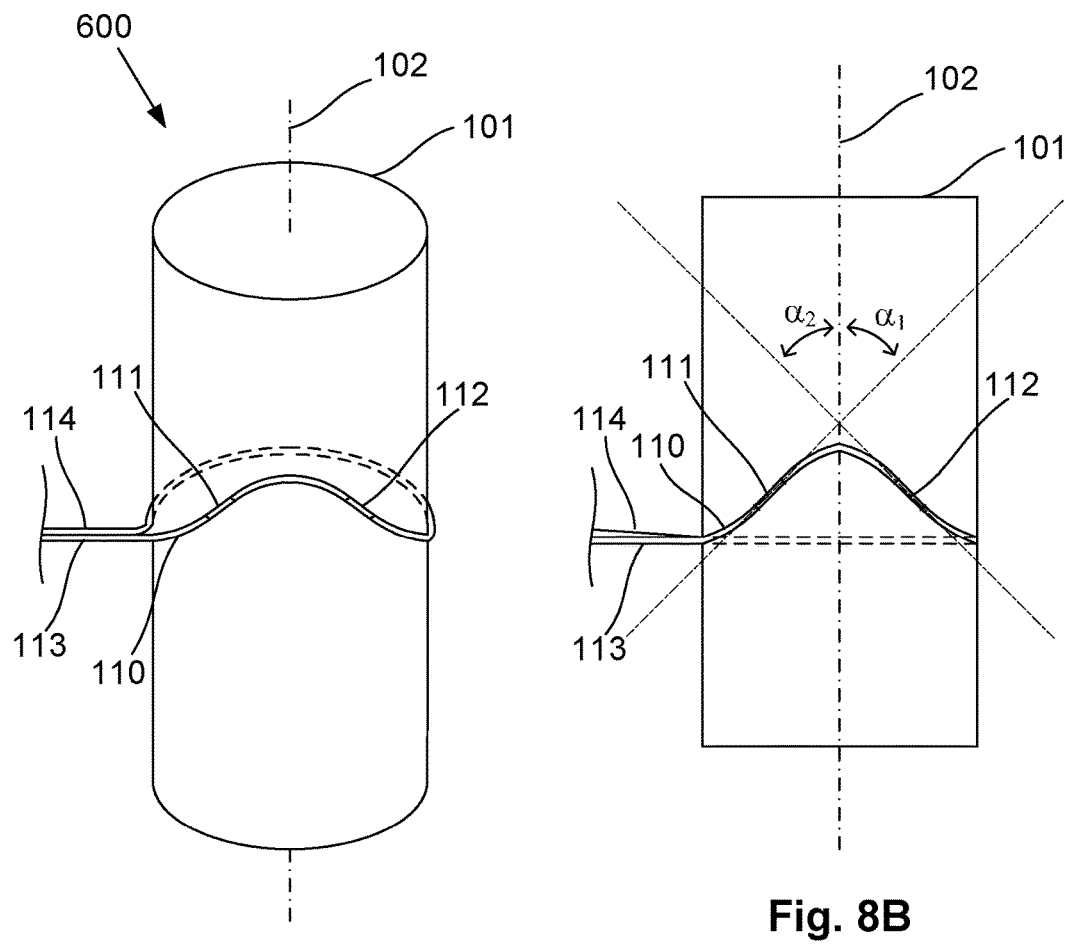
Fig. 8A
Fig. 8B
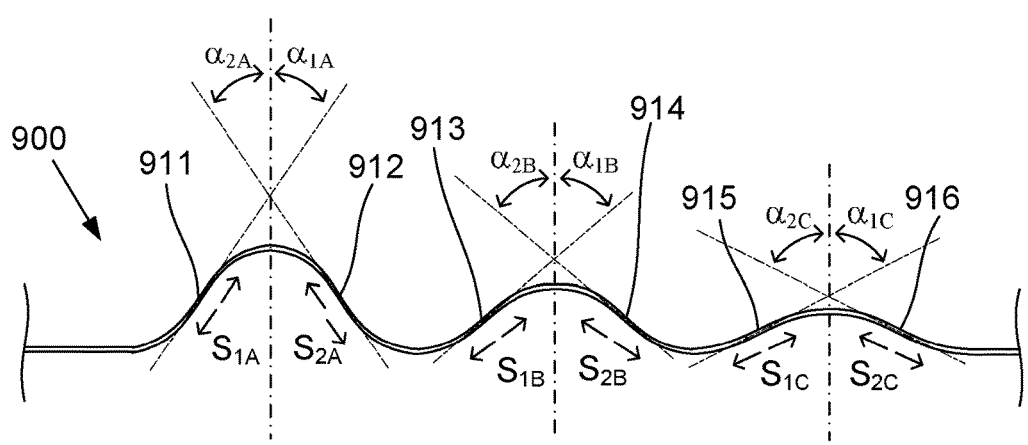
Fig. 9

DEFORMATION MEASUREMENT METHOD AND APPARATUS

This application is a National Stage Application of PCT/AU2015/050361, filed 29 Jun. 2015, which claims benefit of Serial No. 2014902497, filed 30 Jun. 2014 in Australia and which applications are incorporated herein by reference. To the extent appropriate, a claim of priority is made to each of the above discloser application.

BACKGROUND OF THE INVENTION

The present invention relates to a method and apparatus for measuring deformation of a body using optical fibre strain sensing techniques.

DESCRIPTION OF THE PRIOR ART

Deformations of objects or structures under applied loads or other stimulus have traditionally been measured using electrical strain gauges, which typically include an electrical conducting element configured to exhibit variable electrical resistance properties depending on a level of strain in a surface to which the strain gauge is attached.

Techniques are also known for measuring strain along optical fibres which can be configured to exhibit variable optical responses depending on the level of strain. Optical fibre strain sensors can be desirable over traditional electrical strain gauges in a range of circumstances, including in situations where strain sensing is required remotely from electrical power sources or in harsh environments, such as where high temperature conditions are likely to be encountered. Optical fibre strain sensors can also allow measurements to be taken at multiple points along the length of a fibre.

A Fibre Bragg Grating (FBG) may be formed in a segment of an optical fibre to provide a strain sensitive element at a predetermined point along the length of a fibre. An FBG reflects particular wavelengths of light and transmits all others, with the reflected wavelengths being characterised by a Bragg wavelength. The Bragg wavelength depends on dimensional characteristics of the FBG and thus is sensitive to strain. Accordingly, a strain of the optical fibre can be measured based on a shift in the Bragg wavelength compared to that under known conditions. The Bragg wavelength may also shift due to thermal changes in the refractive index of the fibre and expansion/contraction of the optical fibre. Multiple FBGs can be formed in respective segments of the same optical fibre, each with distinct Bragg wavelengths, to allow multiple strain measurements using the same optical fibre.

Alternative technologies for measuring strain along optical fibres are also known. For example, strain may be measured using techniques which detect scattering of electromagnetic radiation along the length of an optical fibre, such as by Brillouin scattering, Raman scattering or Rayleigh scattering. These techniques can allow distributed strain sensing along a length of an optical fibre as opposed to discrete strain sensitive elements formed by FBGs or the like, although will typically require more sophisticated processing equipment.

U.S. Pat. No. 7,315,666 discloses a method and system for measuring pressure and other physical data, such as the temperature, elongation, torsion and bending at any point along the length of an elongate carrier tube by means of coiled optical fibers that are embedded in the wall of the tube such that deformation of the carrier tube induces strain in each optical fiber. In use a pulsed laser light source transmits a sequence of light pulses of a selected wavelength from an upstream end of each fiber into a coiled substantially uniform light guide channel provided by the optical fiber and a light sensor assembly detects any shift in wavelength of the light pulses backscattered from various locations along the length of the light guide channel. A signal processing assembly then calculates a strain pattern along the length of the fiber, and a pressure difference between the interior and exterior of the tube, at various locations along the length of the carrier tube. Preferably several fibers are wound at different pitch angles and in different directions and at different diameters in the wall of the carrier tube and the signal processing assembly calculates bending, torsion and both radial and axial deformation of the carrier tube on the basis of a comparison of the strain patterns induced on different optical fibers.

U.S. Pat. No. 8,131,121 discloses an optical fiber pipeline monitoring system and method. In accordance with one aspect, a fiber surveillance system for monitoring a pipeline is provided. The surveillance system includes an optical fiber acoustically coupled to the pipeline to detect acoustic signals associated with vibrations or other activity near or from the pipeline. Optical energy is injected into the optical fiber and an optical detector receives an optical return-signal having certain characteristics resulting from vibrations impinging on the optical fiber. An analyzer is configured to determine operating information about the pipeline based on the optical return-signal. Two or more fibers can be acoustically coupled to the pipeline and arranged in varying configurations to yield greater resolution.

WO2009/068907 discloses a pipe and a method of determining the shape of a pipe. The pipe has an optical fibre strain sensor embedded within it. The optical fibre strain sensor comprises an optical fibre having an array of fibre Bragg gratings (FBG) provided within it. The FBGs are arranged in a spaced array along the fibre. The optical fibre strain sensor is helically wound, with a fixed helix pitch, around the axial length of the pipe. The FBGs are thereby arranged in a predetermined orientation relative to the axis of the pipe. A method of determining the shape of a pipe, including decoupling the effects of bending, tension, torsion and hoop strain on the strain measurements made by the FBGs and/or interpolating the strain measurements to obtain a fully distributed strain profile of the pipe.

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

SUMMARY OF THE PRESENT INVENTION

In a broad form the present invention seeks to provide apparatus for measuring deformation of an elongate body defining an axis, the apparatus including:
  a) an optical fibre arranged relative to the body, the optical fibre including:
    i) a first strain sensitive optical fibre portion coupled to the body and at least partially aligned at a first angle relative to the axis; and,
    ii) a second strain sensitive optical fibre portion coupled to the body and at least partially aligned at a second angle relative to the axis, the second angle being opposite to the first angle;

b) a radiation source connected to an end of the optical fibre, the radiation source being for supplying electromagnetic radiation to the optical fibre;

c) a sensor connected to an end of the optical fibre, the sensor being for sensing electromagnetic radiation received from the first and second optical fibre portions; and, d) a processing device for determining the deformation of the body using the sensed electromagnetic radiation, the deformation including any axial or torsional deformation.

Typically the processing device determines deformation of the body by:

a) determining, using the sensed electromagnetic radiation:
   i) a first strain indicator indicative of a first strain on the first optical fibre portion; and,
   ii) a second strain indicator indicative of a second strain on the second strain sensing portion; and,
b) determining deformations of the body at least partially based on the first and second strain indicators.

Typically the processing device compares the first and second strain indicators to distinguish between axial and torsional deformations of the body.

Typically the processing device determines that the body is undergoing an axial deformation based on a common mode response of the first and second strain indicators.

Typically the processing device determines that the body is undergoing a torsional deformation based on a differential response of the first and second strain indicators.

Typically the optical fibre includes a third strain sensitive optical fibre portion that is thermally coupled to the body, wherein the processing device:

a) determines, using the sensed electromagnetic radiation, a coupled temperature indicator indicative of a temperature of the third optical fibre portion; and,
b) determines a temperature of the body based on the coupled temperature indicator.

Typically the optical fibre further includes a fourth strain sensitive optical fibre portion that is mechanically and thermally decoupled from the body, wherein the processing device:

a) determines, using the sensed electromagnetic radiation, a decoupled temperature indicator indicative of a temperature of the fourth optical fibre portion; and,
b) determines an ambient temperature based on the decoupled temperature indicator.

Typically the processing device uses at least one temperature indicator to determine a temperature induced deformation of the body.

Typically the processing device determines axial and torsional deformation at least in part using the temperature induced deformation of the body.

Typically the fourth optical fibre portion is provided at a terminal end of the optical fibre.

Typically both the radiation source and the sensor are connected to a proximal end of the optical fibre.

Typically the received electromagnetic radiation is at least one of transmitted and reflected electromagnetic radiation from the optical fibre portions.

Typically each optical fibre portion has a different optical response characteristic to thereby allow respective strain indicators to be determined for each optical fibre portion using the sensed electromagnetic radiation.

Typically each optical fibre portion includes a fibre Bragg grating.

Typically each fibre Bragg grating has a predetermined Bragg wavelength, such that the strain of the respective strain element can be determined based on a shift of the respective Bragg wavelength.

Typically each strain sensitive optical fibre portion includes a distributed strain sensitive element defined by the optical fibre.

Typically each strain sensitive optical fibre portion is provided by naturally occurring microstructures within the optical fibre portions having predetermined optical response characteristics.

Typically each strain sensitive optical fibre portion generates a strain indicator in response to the supplied electromagnetic radiation by at least one of:

a) Brillouin scattering;
b) Raman scattering; and,
c) Rayleigh scattering.

Typically each strain sensitive optical fibre portion is provided by a continuous uniform grating.

Typically the radiation source supplies a pulse of electromagnetic radiation and the processing device determines respective strain indicators for each strain sensitive optical fibre portion based on a pulse response time.

Typically the sensor senses the received electromagnetic radiation using at least one of:

a) interferometry;
b) spectroscopy; and,
c) backscattering.

Typically at least the first and second optical fibre portions are coupled to the body using an adhesive.

Typically at least the first and second optical fibre portions are coupled to the body in a channel defined in a surface of the body.

Typically at least the first and second optical fibre portions are integrally formed with the body.

Typically the optical fibre is looped around the body to define first and second fibre lengths extending across the body from a looped fibre portion, the first fibre length extending at the first angle and including the first strain sensitive optical fibre portion, and the second fibre length extending at the second angle and including the second strain sensitive optical fibre portion.

Typically the optical fibre is looped around the body to define first and second helical aspects at least partially wound around the body in opposing winding directions, the first helical aspect including the first strain sensitive optical fibre portion, and the second helical aspect including the second strain sensitive optical fibre portion.

Typically each helical aspect includes a plurality of windings and a plurality of strain sensitive optical fibre portions.

Typically different ones of the windings have different pitch angles to thereby align strain sensitive optical fibre portions at different angles.

Typically the optical fibre runs along the body and is bent to define first and second fibre lengths extending from a bent portion, the first fibre length extending at the first angle and including the first strain sensitive optical fibre portion, and the second fibre length extending at the second angle and including the second strain sensitive optical fibre portion.

Typically the optical fibre is wrapped circumferentially around the body and includes a wave defining rising and falling fibre lengths, the rising fibre length including the first strain sensitive optical fibre portion, and the falling fibre length including the second strain sensitive optical fibre portion.

Typically the optical fibre includes a plurality of waves, each wave defining respective rising and falling fibre lengths having respective strain sensitive optical fibre portions.

Typically different ones of the waves include respective rising and falling fibre lengths having different slope angles to thereby align strain sensitive optical fibre portions at different angles.

Typically the optical fibre includes a plurality of pairs of first and second strain sensitive optical fibre portions aligned at different respective first and second angles.

In another broad form the present invention seeks to provide a method for measuring deformation of an elongate body defining an axis, the method including, in a processing device:
 a) determining from a sensor connected to an end of an optical fibre, sensed electromagnetic radiation received from first and second strain sensitive optical fibre portions, the first optical fibre portion being coupled to the body and at least partially aligned at a first angle relative to the axis and the second strain sensitive optical fibre portion coupled to the body and at least partially aligned at a second angle relative to the axis, the second angle being opposite to the first angle; and,
 b) determining deformation of the body using the sensed electromagnetic radiation, the deformation including any axial or torsional deformation.

BRIEF DESCRIPTION OF THE DRAWINGS

An example of the present invention will now be described with reference to the accompanying drawings, in which:

FIG. 1A is a schematic diagram of a first example of apparatus for measuring deformation of a body;

FIG. 1B is a front view of the body and an optical fibre arranged relative to the body as shown in FIG. 1A;

FIG. 8A is a schematic diagram of a fifth example of apparatus for measuring deformation of a body;

FIG. 8B is a front view of the body and an optical fibre arranged relative to the body as shown in FIG. 8A;

FIG. 9 is a schematic view of an optical fibre having three waves with different slope angles, in an unwrapped configuration;

DETAILED DESCRIPTION OF THE PREFERRED EMBODIMENTS

Figures 2A, 2B:
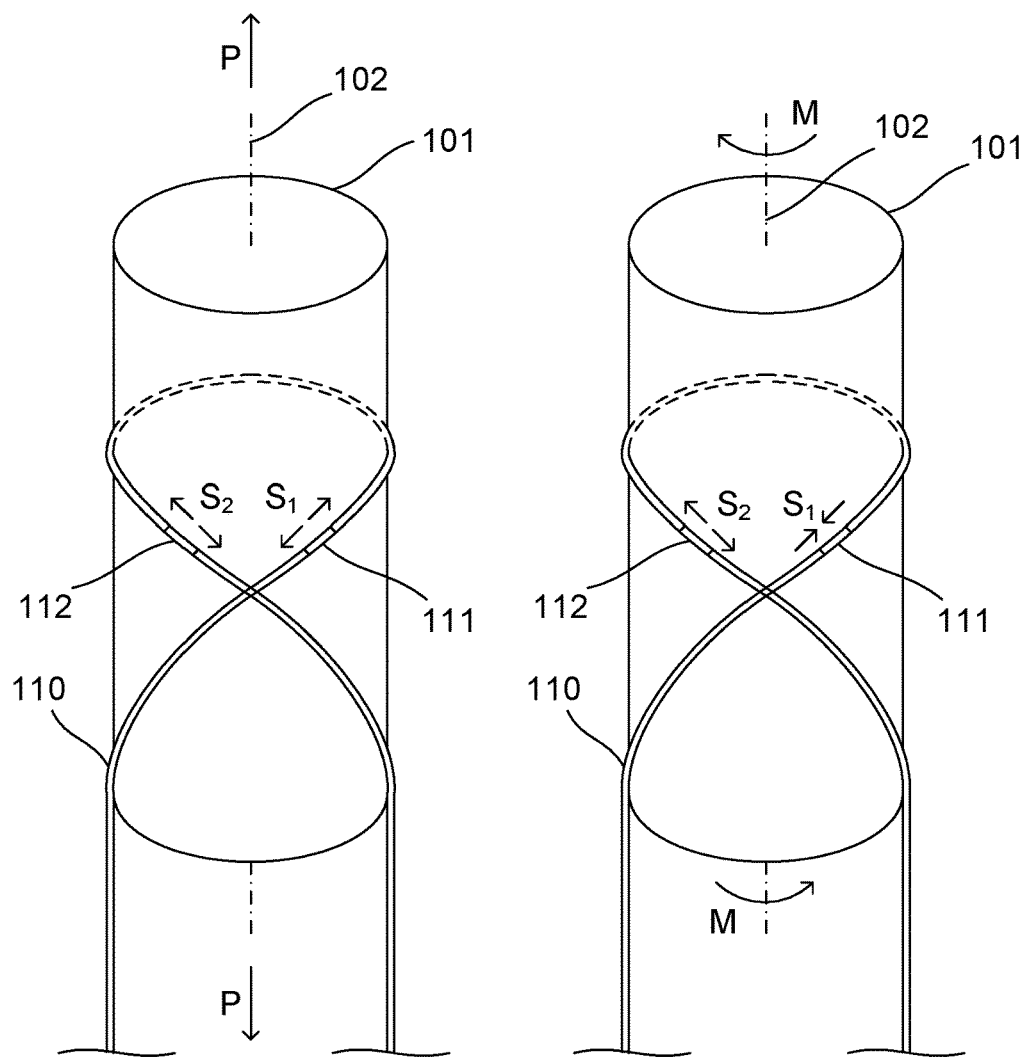
FIG. 2A is a schematic view of the body and the optical fibre of FIG. 1A, in which an axial load is applied to the body to cause axial deformation of the body.
FIG. 2B is a schematic view of the body and the optical fibre of FIG. 1A, in which a torsional load is applied to the body to cause torsional deformation of the body.

An example of apparatus 100 for measuring deformation of an elongate body 101 defining an axis 102 will now be described with reference to FIGS. 1A and 1B.

In general terms, the apparatus 100 includes an optical fibre 110 arranged relative to the body 101, a radiation source 120 connected to an end of the optical fibre 110, a sensor 130 connected to an end of the optical fibre 110, and a processing device 140.

In particular, the optical fibre 110 includes a first strain sensitive optical fibre portion 111 that is coupled to the body 101 and at least partially aligned at a first angle $\alpha_1$ relative to the axis 102, and a second strain sensitive optical fibre portion 112 that is also coupled to the body 101 and at least partially aligned at a second angle $\alpha_2$ relative to the axis. The second angle $\alpha_2$ is opposite to the first angle $\alpha_1$ as can be seen in FIG. 1B.

The radiation source 120 is provided for supplying electromagnetic radiation to the optical fibre 110, as indicated by arrow 103 in FIG. 1A, whilst the sensor 130 is provided for sensing electromagnetic radiation received from the first and second optical fibre portions 111, 112, as indicated by arrow 104 in FIG. 1A.

The electromagnetic radiation can be from any region of the electromagnetic spectrum suitable for use with the optical fibre 110. Whilst the electromagnetic radiation will typically be in the form of light, having wavelengths ranging from the infrared, visible and ultraviolet light regions of the electromagnetic spectrum, it should be appreciated that other wavelengths may be used.

The processing device 140 is provided for determining the deformation of the body 101 using the sensed electromagnetic radiation, where the deformation may include any axial or torsional deformation of the body.

It will be appreciated that the opposite angles $\alpha_1$, $\alpha_2$ of the respective strain sensitive optical fibre portions 111, 112 will cause each optical fibre portion 111, 112 to experience different strains relative to one another, depending on the particular deformation state of the body 101.

Figures 3A, 3B:
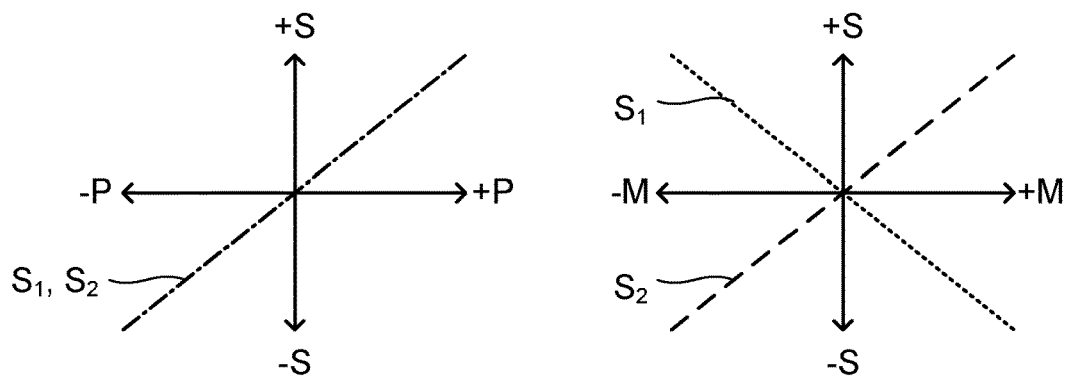
FIG. 3A is a plot depicting relationships between applied axial loading and strain indicators determined due to axial deformation of the body.
FIG. 3B is a plot depicting relationships between applied torsional loading and strain indicators determined due to torsional deformation of the body.

For example, as illustrated in FIG. 2A, an applied tensile axial load P will typically result in tensile strains $S_1$, $S_2$ in the respective optical fibre portions 111, 112. In the present example, in which the angles $\alpha_1$, $\alpha_2$ are equal in magnitude and opposite in direction, each of the optical fibre portions 111, 112 will undergo substantially the same strain S due to an applied axial load P. This relationship between strains $S_1$, $S_2$ in the first and second optical fibre portions 111, 112 and applied axial loading is depicted in FIG. 3A, where tensile loads and strains are indicated as positive and compressive loads and strains are indicated as negative. In the present example, in which the angles $\alpha_1$, $\alpha_2$ are equal in magnitude and opposite in direction, each of the optical fibre portions 111, 112 will have substantially the same strain response due to an applied axial load P.

In contrast, with regard to the example illustrated in FIG. 2B, applied torsional moment M will result in opposing strains $S_1$, $S_2$ in the respective optical fibre portions 111, 112. For instance, when the torsional moment is applied in a right-handed direction as shown in FIG. 2B, this will result in a compressive strain $S_1$ in the first optical fibre portion 111 and a tensile strain $S_2$ in the second optical fibre portion 112. The relationship between the strains $S_1$, $S_2$ in the first and second optical fibre portions 111, 112 and applied torsional loading by way of moment M is depicted in FIG. 3B, where right-handed moments and tensile strains are indicated as positive. In contrast to the strain response due to an applied axial load, each of the optical fibre portions 111, 112 will have substantially opposite strain responses due to an applied torsional moment M.

In view of these different strain responses to different types of applied loads, it will be appreciated that the arrangement of strain sensitive optical fibre portions 111, 112 can be used to distinguish between axial and torsional deformations of the body. Typically this is facilitated by having the processing device 140 process the sensed electromagnetic radiation received from the first and second optical fibre portions 111, 112 (via the sensor 130) to determine values indicative of the strains $S_1$, $S_2$ in the strain sensitive optical fibre portions 111, 112, and subsequently use these values to determine any axial or torsional deformation of the body based on known strain response relationships such as those exemplified in FIGS. 3A and 3B.

It should be understood that whilst having the first and second optical fibre portions 111, 112 aligned at angles $\alpha_1$, $\alpha_2$ of equal magnitude as discussed above will generally be convenient as this will allow simplified interpretation of the different strain response relationships, this is not essential and useful results may still be obtained provided the angles $\alpha_1$, $\alpha_2$ are opposite in direction relative to the axis. It should also be understood that the strain response relationships of the optical fibre portions 111, 112 will not always necessarily be the same as discussed above, and may depend on factors such as the magnitude of the angles $\alpha_1$, $\alpha_2$ and/or material properties of the body 101, such as Poisson's ratio. In any event, it will be appreciated that the particular strain response relationships for an arrangement of optical fibre portions 111, 112 about a body can be predetermined, and any axial or torsional deformation of the body 101 can be determined based on the predetermined strain response relationships.

In any event, it will be appreciated that the above described apparatus 100 can allow axial and torsional deformations of the body 101 to be determined using only a single optical fibre arranged relative to the body 101. The other apparatus elements of the radiation source 120, sensor 130 and processing device 140 can be provided remotely as long as the radiation source 120 and sensor 130 are each connected to an end of the optical fibre 110.

As per the example of FIG. 1A, the radiation source 120 may be connected to an end of a first extended length 113 of the optical fibre 110 and the sensor 130 may be connected to an end of a second extended length 114 of the optical fibre 110, such that the strain sensitive optical fibre portions can be deployed on a body 101 remotely from the radiation source 120, sensor 130 and processing device 140 by having the first and second extended lengths 113, 114 of the optical fibre 110 extend between the body 101 and the radiation source 120 and sensor 130, respectively.

The radiation source 120 can thus supply electromagnetic radiation to the optical fibre 110 via the first extended length 113 of the optical fibre 110 and electromagnetic radiation will be transmitted through the first and second strain sensitive optical fibre portions 111, 112 and then be received by the sensor via the second extended length 114 of the optical fibre 110. The sensed electromagnetic radiation can then be used by the processing device 140 to determine the deformation of the body 101.

Figures 4A, 4B:
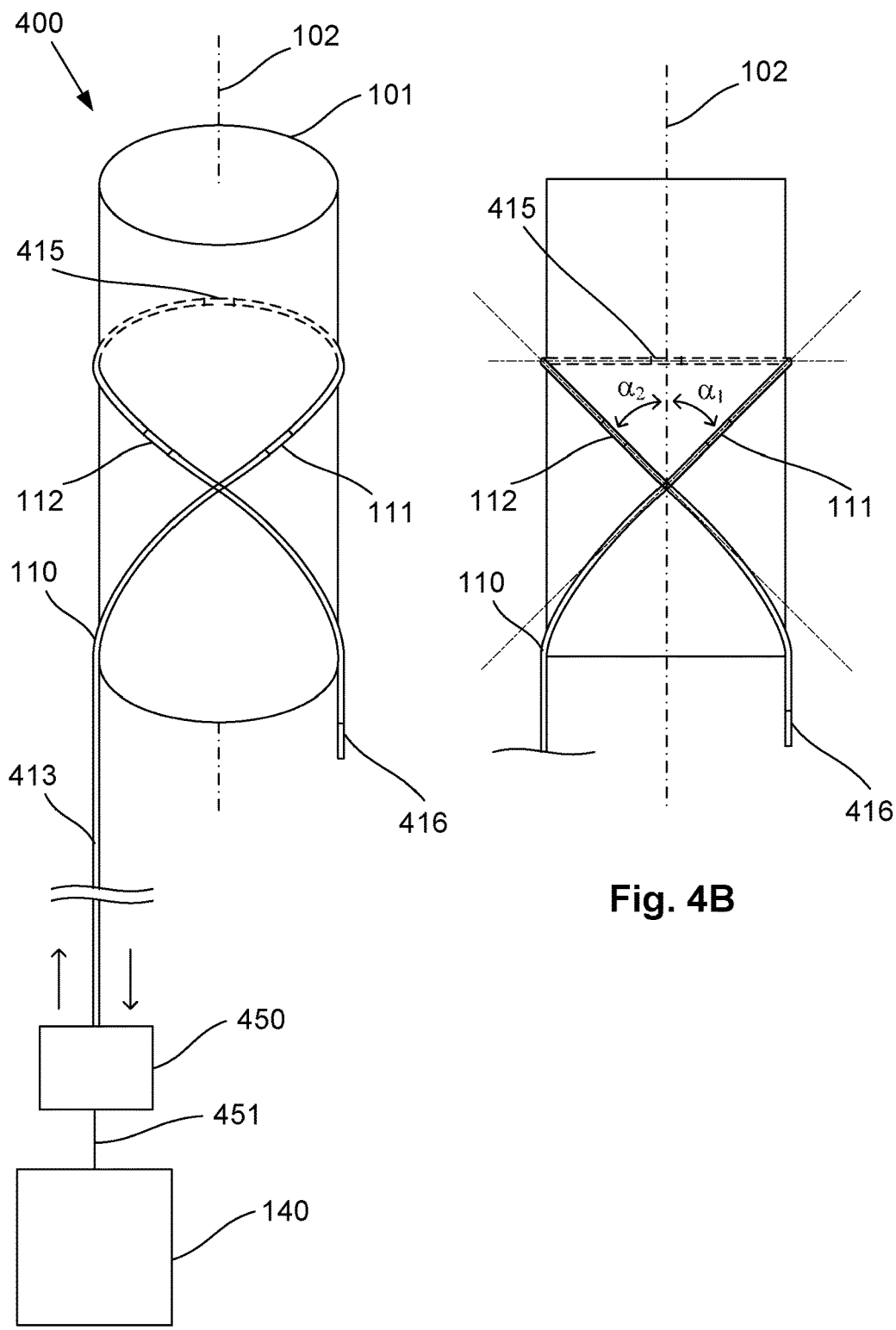
FIG. 4A is a schematic diagram of a second example of apparatus for measuring deformation of a body.
FIG. 4B is a front view of the body and an optical fibre arranged relative to the body as shown in FIG. 4A.

However, those familiar with the art of fibre optics will appreciate that connections to each end of the optical fibre 110 are not necessarily required. For instance, with regard to the example of an alternative embodiment of apparatus 400 as shown in FIG. 4A, the apparatus 400 may use a single extended length 413 of the optical fibre 110 and have an active sensor unit 450 which incorporates the radiation source 120 and the sensor 130 and is connected to the processing device 140.

In particular, the radiation source 120 of the active sensor unit 450 can supply electromagnetic radiation to the optical fibre 110 via the single extended length 413 of the optical fibre 110 and electromagnetic radiation reflected from the first and second strain sensitive optical fibre portions 111, 112 will be received by the sensor 130 of the active sensor unit 450, also via the single extended length 413 of the optical fibre 110. Again, the sensed electromagnetic radiation can then be used by the processing device 140 to determine the deformation of the body 101. Thus it will be understood that in some embodiments only a single length of optical fibre 110 may be extended between the body 101 and the sensing/processing equipment.

In either case, it will be appreciated that apparatus provided based on the above described can be particularly advantageous in allowing measurements of deformations of a body positioned remotely from sensing and processing equipment, and can facilitate deformation measurements in extreme environments without exposing sensitive equipment to potential harm.

For example, the above described techniques may be particularly suitable for allowing compressive and torsional deformations to be measured in a portion of deployed coiled tubing supporting a downhole drilling motor during drilling operations. In these operations, the coiled tubing will provide reaction forces against drilling loads and it is desirable to monitor the resulting deformations so as to ensure stresses in the support structure do not exceed safe operating parameters.

In such examples, the optical fibre portions 111, 112 can be fitted to a portion of the coiled tubing proximate to the drilling motor and one or two extended lengths of the optical fibre 110 can be extended up the drilling hole to the radiation source 120, sensor 130 and processing device 140 located above ground. It will be appreciated that the length(s) of optical fibre connecting the strain sensitive optical fibre portions 111, 112 to the sensing and processing equipment can be housed inside the deployed tubing, and the radiation source 120, sensor 130 and processing device 140 may be integrated with other equipment for deploying the coiled tubing and controlling the drilling operations.

In another example, the optical fibre portions 111, 112 may be arranged about the base of a pole, such as a light pole, to measure applied loads during installation or ongoing loading in use.

In view of the above, it will be understood that the apparatus 100 enables a method for measuring deformation of an elongate body 101 defining an axis 102, the method including, in a processing device 140, determining from a sensor 130 connected to an end of an optical fibre 110, sensed electromagnetic radiation received from first and second strain sensitive optical fibre portions 111, 112, the first optical fibre portion 111 being coupled to the body 101 and at least partially aligned at a first angle $\alpha_1$ relative to the axis 102 and the second strain sensitive optical fibre portion 112 coupled to the body 101 and at least partially aligned at a second angle $\alpha_2$ relative to the axis 102, the second angle $\alpha_2$ being opposite to the first angle $\alpha_1$, and subsequently determining deformation of the body 101 using the sensed electromagnetic radiation, the deformation including any axial or torsional deformation.

Further details regarding the above discussed techniques will now be described along with further optional features of suitable embodiments of the apparatus.

With regard to the embodiment of the apparatus 100 depicted in FIG. 1A, it will be appreciated that the sensor 130 may be connected to the processing device 140 as indicated at 131, to provide outputs based on the sensed electromagnetic radiation to the processing device 140 for processing.

The radiation source 120 may also optionally be connected to the processing device 140 at 121, to enable the processing device 140 to control the supply of electromagnetic radiation to the optical fibre 110. This may not be essential for some methods of interrogating the strain sensitive optical fibre portions 111, 112 where a constant supply of electromagnetic radiation may be sufficient, although some other methods may require the supply of controlled pulses and/or wavelength variations of the electromagnetic radiation in which control and potentially feedback of the supply of electromagnetic radiation may be needed.

A similar arrangement can be provided for in the example of FIG. 4A, where the active sensor unit 450 may be connected to the processing device 140 as indicated at 451, and this connection may be unidirectional to only provide outputs of the sensor 130 to the processing device 140, or bi-directional to allow the processing device 140 to control at least some functionalities of the active sensor unit 450.

In some embodiments, the processing unit 140 and the active sensor unit 450 may also be integrated into a single unit. Any combination of the radiation source 120, sensor 130, processing unit 140 may be housed in a common enclosure and therefore appear as a single unit. However, it will be appreciated this is not essential, and different elements of the apparatus 100 may or may not be integrated depending on requirements.

In some embodiments, the processing device 140 determines deformation of the body 101 by determining, using the sensed electromagnetic radiation, a first strain indicator indicative of a first strain $S_1$ on the first optical fibre portion 111 and a second strain indicator indicative of a second strain $S_2$ on the second strain sensing portion 112, and subsequently determining deformations of the body 101 at least partially based on the first and second strain indicators.

These strain indicators may be determined based on the particular technique used to provide the strain sensitive optical fibre portions 111, 112. For instance, in some examples, the strain sensitive optical fibre portions 111, 112 are provided by forming particular strain sensitive elements in segments of the optical fibre 110 at known locations, and with respective known strain response characteristics so that the strain indicators for each strain-sensitive optical fibre portions 111, 112 can be determined based on these characteristics. For example, the strain-sensitive optical fibre portions 111, 112 may be formed to have particular wavelengths reflected but other wavelengths transmitted, depending on strain.

Alternatively, the processing device 140 may use other techniques to determine the strain indicators. For example, a pulse of electromagnetic radiation at a predetermined wavelength may be supplied into the optical fibre 110 and the processing device 140 may be configured to analyse sensed electromagnetic radiation that has been reflected from microstructures within the optical fibre 110. Changes in the wavelength or phase of the reflected electromagnetic radiation will be indicative of strains in the optical fibre 110. Time delays of the reflections of the pulse from different portions of the optical fibre may be used to pin-point the location along the optical fibre 110 at which the change has taken place, so that strain indicators for particular strain-sensitive optical fibre portions 111, 112 of the optical fibre 110 can be determined. In such cases the apparatus 100 may require calibration based on the particular optical fibre 110 being used before it can provide reliable results, whereas forming particular strain sensitive elements may reduce or eliminate the need to calibration. Whilst it will be understood that this example technique operates in the optical time domain, it will be appreciated that other techniques may operate in the optical frequency domain. For instance, measured signals may be converted into the frequency domain using a Fourier transform or the like, allowing frequency domain signal processing techniques to be applied.

It will be appreciated that a range of other techniques may be used other than those described above may be used to determine the strain indicators, and examples of suitable techniques will be described in further detail below.

In any event, the processing device 140 may compare the first and second strain indicators to distinguish between axial and torsional deformations of the body 101. For instance, these comparisons can be made in view of known strain responses of the respective strain sensitive optical fibre portions 111, 112 as shown in FIGS. 3A and 3B.

For example, the processing device 140 may determine that the body 101 is undergoing an axial deformation based on a common mode response of the first and second strain indicators. Similarly, the processing device 140 may determine that the body 101 is undergoing a torsional deformation based on a differential response of the first and second strain indicators.

Figure 5:
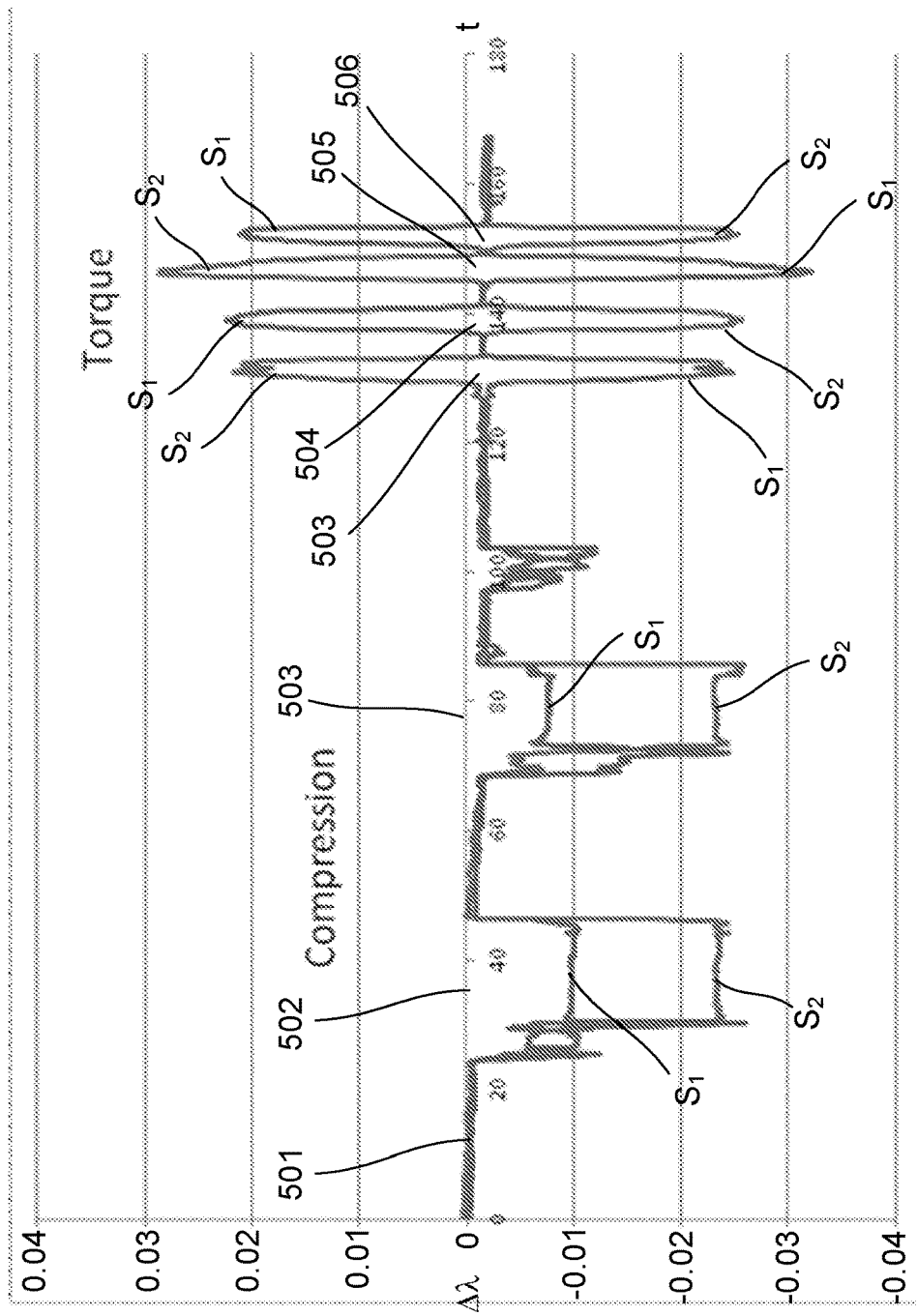
FIG. 5 is a plot of example strain indicators under different loading conditions applied to a cylindrical body provided with apparatus for measuring deformation of the body.

FIG. 5 shows a plot illustrating comparisons between the first and second strain indicators corresponding to respective first and second strains $S_1$ and $S_2$ in the first and second strain sensitive optical fibre portions 111, 112. The x-axis represents time whilst the y-axis represents a strain indicator value in the form of a shift in a characteristic wavelength of light reflected from each strain sensitive optical fibre portions 111, 112, so that the respective curves correspond to the first and second strain indicators corresponding to the first and second strains $S_1$ and $S_2$ (as marked) over a period of time during which different types of loading were applied to the body 101.

At 501, there are no applied loads and the strain indicator values corresponding to the first and second strains $S_1$ and $S_2$ are approximately zero. However, when compression loads are applied at 502 and 503, there is a common mode response of the first and second strain indicators corresponding to compressive first and second strains $S_1$ and $S_2$. Torque loads are later applied in subsequently alternating directions at 503, 504, 505, 506, resulting in differential responses of the first and second strain indicators corresponding to strains $S_1$ and $S_2$ in opposing directions.

The apparatus 100 not only allows axial and torsional deformations to be distinguished, but can also allow combinations of such deformations to be determined. For instance, a combination of compression and torque loading will result in a complex deformation of the body 101 depending on the relative magnitudes of the respective loads. However, the processing device 140 can be configured to determine the respective contributions due to axial and torsional deformations based on the common mode and differential responses of the first and second strain indicators.

With reference still to FIG. 5, it is noted that the compression events 502 and 503 cause a differential response component in addition to the common mode response component, which indicates a combination of axial and torsional deformations. This can is believed to be due to the particular manner of generating the compression loading in the experimental apparatus, in which a slight misalignment of applied axial loads could result in non-axial deformations.

Particular embodiments may include additional strain sensitive optical fibre portions which can allow for further expanded functionality.

For example, with regard to the alternative embodiment of the apparatus 400 as shown in FIGS. 4A and 4B, the optical fibre 110 includes a third optical fibre portion 415 mechanically decoupled from the torques and strains applied to the body 101, but thermally connected to the body 101, as can be best appreciated with regard to FIG. 4B. The third optical fibre portion 415 may be thermally connected to the body 101 using, for example, a suitable thermal interface material. In some examples, the third optical fibre portion 415 may be mechanically connected to the body 101 without being affected by torques and strains, such as by bonding the third optical fibre portion 415 to a section of the body 101 that is relieved or cut away from the main portion of the body 101 along each side of the optical fibre portion 415 and across one end of the third optical fibre portion 415, but still attached to the main portion of the body 101 at one end.

In this example, the processing device 140 may additionally determine, using the sensed electromagnetic radiation from the sensor 130, a coupled temperature indicator indicative of a temperature of the third optical fibre portion 415, and then determine a temperature of the body 101 based on the coupled temperature indicator. As explained further below, this may allow a temperature of the body 101 to be determined.

The third optical fibre portion 415 may be a further strain sensitive optical fibre portion, which is effectively decoupled from axial and torsional deformation modes, but can undergo strains due to thermal expansion or contraction of the body 101 or of the optical fibre 110 itself due to temperature changes. Accordingly, the coupled temperature indicator may be indicative of a third strain $S_3$ on the third optical fibre portion 415, which can be treated as an indication of temperature-based strain of the body 101.

It is acknowledged that the first and second strain indicators indicative of the strains $S_1$, $S_2$ on the first and second optical fibre portion 111, 112 may also indicate temperature-based strains to some extent. However, the contribution to the strains $S_1$, $S_2$ due to temperature effects can effectively be compensated for in the determination of axial and torsional deformations, because the temperature-based strain components can be isolated based on knowledge of the third strain $S_3$ which is based on temperature only. It will be appreciated that this can be particularly useful when the body 101 is located in temperature instable environments. Determining the temperature from the mechanically decoupled third optical fibre portion 415 can also avoid spurious strains due to other deformation types such as bending or due to transverse stretching/contracting of the body as a result of applied axial loading, due to the Poisson effect.

Accordingly, the processing device may use the coupled temperature indicator to determine a temperature induced deformation of the body 101. Subsequently, the processing device 140 may determine axial and torsional deformation of the body 101 at least in part using the temperature induced deformation of the body 101.

It should be understood that temperature changes will also cause changes in the refractive index of the optical fibre 110. Such refractive index changes may result in different characteristic responses to electromagnetic radiation supplied to the third optical fibre portion 415, which could additionally or alternatively be used to determine the temperature, depending on the configuration of the third optical fibre portion 415. Thus, the third optical fibre portion 415 may also allow for temperature measurements without necessarily requiring a strain sensitive optical fibre portion. Despite this, techniques for providing a strain sensitive optical fibre portion, such as by providing fibre Bragg gratings, can also provide a suitable temperature-sensitive optical fibre portion, and thus, the third optical fibre portion 415 will generally be provided in the form of an additional strain sensitive optical fibre portion.

The third optical fibre portion 415 may be conveniently located in a loop of the optical fibre 110 between respective lengths of the optical fiber 110 including the first and second optical fibre portions 111, 112. Although this looped arrangement of the optical fibre 110 is not essential, it will be appreciated that this can be a convenient way of arranging portions of the optical fibre 110 on the body 101 which are aligned with opposite angles relative to the axis, and it is noted that a similar looped arrangement is used in the first example of FIGS. 1A and 1B.

In further examples, the optical fibre 110 may include further optical fibre portions that might or might not be mechanically and thermally decoupled from the body 101. The processing device 140 may determine, using the sensed electromagnetic radiation, additional indicators indicative of a state of the optical fibre portion or a stimulus applied to the optical fibre portion. These indicators may be used by the processing device 140 to determine additional parameters such as ambient temperature, pressure, strain, presence of gases and/or chemical elements, acceleration or any other parameters for which optical fibre sensing techniques can be used.

In one example, the optical fibre 110 may include a fourth optical fibre portion 416 that is mechanically and thermally decoupled from the body, as also shown in FIGS. 4A and 4B. In this case, the processing device 140 may determine, using the sensed electromagnetic radiation, a decoupled temperature indicator indicative of a temperature of the fourth optical fibre portion 416. This decoupled temperature indicator may be used by the processing device 140 to determine an ambient temperature. As per the third optical fibre portion 415, the fourth optical fibre portion 416 may be conveniently provided using another strain sensitive optical fibre portion which will typically also have temperature-sensitive response characteristics.

It will be appreciated that the ambient temperature determined using a decoupled temperature indicator may be used to compensate for temperature-based strain components in the first and second optical fibre portion 111, 112 instead of determining the temperature of the body 101 using the coupled temperature indicator. However, in some cases it can be beneficial to determine both the ambient temperature and the temperature of the body 101, such as to determine the extent of localised heating of the body 101 above the ambient temperature.

As depicted in FIGS. 4A and 4B, the fourth optical fibre portion 416 may be provided at a terminal end of the optical fibre 110, particularly in embodiments where an active sensor unit 450 incorporating the radiation source 120 and sensor 130 is used so that only one end of the optical fibre needs to be extended to connect to other equipment. Accordingly, both the radiation source 120 and the sensor 130 will be connected to a proximal end of the optical fibre 110. It will be appreciated that such an arrangement may require the sensor 130 to be configured to sense electromagnetic radiation reflected from the different optical fibre portions 111, 112, 415, 416.

In any case, as mentioned above, the sensed electromagnetic radiation received by the sensor from each of the optical fibre portions 111, 112, 415, 416 will generally be either transmitted or reflected from the optical fibre portions 111, 112, 415, 416.

Each optical fibre portion 111, 112, 415, 416 will preferably have a different optical response characteristic to thereby allow respective strain or temperature indicators to be determined for each optical fibre portion 111, 112, 415, 416 using the sensed electromagnetic radiation.

In some embodiments, each optical fibre portion 111, 112, 415, 416 may include a fibre Bragg grating which exhibits strain-dependent reflectivity/transmissivity characteristics. Typically, each fibre Bragg grating will be formed having a predetermined Bragg wavelength (which characterises the particular wavelengths of light reflected/transmitted through the fibre Bragg grating), such that the strain of the respective strain element can be determined based on a shift of the respective Bragg wavelength.

As discussed above, the refractive index of the optical fibre 110 may also be sensitive to temperature changes. This may in turn result in temperature-dependent reflectivity/transmissivity characteristics. In the case of fibre Bragg gratings, it is noted the Bragg wavelength is defined by the formula $\lambda_{Bragg}=n*L$, where n is the refractive index and L is the period of the Bragg structure), such that the characteristic Bragg wavelength will undergo changes based on strain-induced extension/contraction of the Bragg structure or temperature-induced changes in the refractive index.

Persons skilled in the art will be aware that techniques for providing a strain sensitive element in an optical fibre using a fibre Bragg grating or other analogous techniques for providing an optical fibre strain sensor are well established in the art, and as such any known technique in this regard may be used.

Whilst configuring the optical fibre portions 111, 112, 415, 416 to have different optical response characteristics can assist in allowing determination of the respective strain or temperature indicators, in some alternative embodiments the optical fibre portions 111, 112, 415, 416 may have the same or similar optical response characteristics, and other techniques may be used to determine the respective strain or temperature indicators. For instance, a pulse of electromagnetic radiation may be supplied by the radiation source 120 and the time taken for reflected electromagnetic radiation to be received can be used to distinguish respective strain or temperature indicators for the different optical fibre portions 111, 112, 415, 416.

In other alternative embodiments, each strain sensitive optical fibre portion 111, 112, 415, 416 may include a distributed strain sensitive element defined by the optical fibre 110. For example, each strain sensitive optical fibre portion 111, 112, 415, 416 may be provided by naturally occurring microstructures within the optical fibre portions 111, 112, 415, 416 having predetermined optical response characteristics.

In such embodiments, each strain sensitive optical fibre portion 111, 112, 415, 416 may generate a strain indicator in response to the supplied electromagnetic radiation due to scattering of the electromagnetic radiation, such as by Brillouin scattering, Raman scattering or Rayleigh scattering. It will be appreciated that these embodiments may require a more sophisticated processing device 140 and potentially extensive calibration of the apparatus to account for the particular properties of the optical fibre 110. However, the need for forming discrete fibre Bragg gratings in the optical fibre 110 will be removed, and the associated benefits of this will be greater if additional strain sensitive optical fibre portions are required to increase the resolution of the system or allow the determination of deformations at many different points along the body 101.

Brillouin and Raman scattering techniques work based on changes in the phonon energy in the optical fibre 110 at given locations. Electromagnetic radiation with a predetermined wavelength supplied into the optical fibre 110 is reflected at a different wavelength that is determined by the local phonon energy. The phonon energy is modified by changes in temperature and/or strain applied to the fibre. Hence the local strain/temperature applied to the optical fibre 110 can be determined by analysing the wavelength shift of the reflected light. The location of a given strain is determined by sampling the reflected light at a given time after the pump pulse is launched. The location is determined by the time delay and the speed of light in the optical fibre 110.

In other embodiments, distributed strain sensitive elements may be defined in the form of a continuous uniform grating, such as fibre Bragg grating extending along a length of the optical fibre 110. Such an arrangement can allow techniques to be used which are a hybrid of the discrete and distributed techniques above discussed, allowing a compromise between the processing efficiency of the discrete techniques and the available resolution of the distributed techniques.

In one example using a continuous uniform grating, the radiation source 120 supplies a pulse of electromagnetic radiation and the processing device 140 determines respective strain indicators for each strain sensitive optical fibre portion based on a pulse response time of the sensed electromagnetic radiation received by the sensor 130. It will be understood that this can allow signals received from different portions of the continuous uniform grating to be distinguished based on the time taken for these to reach the sensor 130, rather than by relying on different optical response characteristics for each portion.

The radiation source 120 may be provided using any suitable source of electromagnetic radiation of the appropriate wavelength spectrum for interrogating the strain sensitive optical fibre portion 111, 112, 415, 416. For example, in embodiments using fibre Bragg gratings having particular Bragg wavelengths, the radiation source 120 should be configured to supply a spectrum of electromagnetic radiation covering the respective Bragg wavelengths and with additional bandwidth to accommodate any shifts in the Bragg wavelengths that may occur due to deformations of the body 101. Suitable radiation sources may be provided using a Light Emitted Diode (LED), a tuneable laser or any other suitable source of light or other forms of electromagnetic radiation.

Alternatively, the radiation source 120 may be of a narrowband nature selected to coincide with the edge of one or more of the fibre Bragg gratings. In this instance, a strain applied to a fibre Bragg grating will shift its spectral profile and hence change the intensity of the reflected narrowband light.

The sensor 130 may sense the received electromagnetic radiation using at least one of interferometry, spectroscopy and backscattering. In one example, the sensor 130 may be provided in the form of an optical spectrum analyzer which uses reflective and/or refractive or diffractive techniques to separate out the wavelengths of electromagnetic radiation received from the optical fibre portions 111, 112, 415, 416, and subsequently uses an electro-optical detector to measure the intensity of the electromagnetic radiation at different wavelengths. The output of this spectroscopy technique can then be provided to the processing device 140 to allow strain indicators to be determined as discussed above and to subsequently allow the deformation of the body 101 to be determined.

It is noted that fibre Bragg grating techniques typically use reflection although transmission can be used if needed, where the characteristic Bragg wavelength is determined based on wavelengths that have effectively been filtered during transmission rather than wavelengths that have been reflected. It is also noted that Brillouin scattering, Raman scattering and Rayleigh scattering are backscattered techniques. Brillouin Optical Time Domain Analysis may be used by supplying pump radiation from one end of the optical fibre 110 and supplying probe radiation from the other end. Alternatively, Optical Frequency Domain Reflectometry (OFDR) may be used, which is a reflective technique.

The particular configuration of the processing device 140 may depend to some extent on the form of the sensor 130 being used and the resulting form of the output provided to the processing device 140. For example, in the example in which the sensor 130 is provided in the form of an optical spectrum analyzer, the output may be in the form of electrical signals representing the intensity of the electromagnetic radiation at respective wavelengths, and additional equipment such as an analogue to digital converter may be required to allow digital processing of the output by the processing device 140. Alternatively, the sensor 130 may be configured to directly output digital data indicating the intensity of the sensed electromagnetic radiation at different wavelengths, which can then be readily processed by the processor of a general purpose computer system configured with suitable processing instructions.

Accordingly, the nature of the processing device 140 and its functionality will vary depending on particular requirements of the apparatus. In one particular example, the processing device may include at least one processor, a memory, an optional input/output device, such as a keyboard and/or display, and an external interface for allowing the output from the sensor to be received. In use, the processor executes instructions in the form of applications software stored in the memory to perform required processes, such as determining strain indicators and comparing these for determining deformations of the body 101. Thus, actions performed by the processing device 140 may be performed by the processor in accordance with instructions stored as applications software in the memory and/or input commands received via the input/output device. The applications software may include one or more software modules, and may be executed in a suitable execution environment, such as an operating system environment, or the like.

Accordingly, it will be appreciated that the processing device 140 may be formed from any suitable processing system, such as a suitably programmed computer system, PC, lap-top, hand-held PC, server, or the like. In one particular example, the processing device is a standard processing system such as an Intel or AMD Architecture based processing system, which executes software applications stored on non-volatile (e.g., hard disk) storage, although this is not essential. However, it will also be understood that the processing device 140 could be or could include any electronic processing device such as a microprocessor, microchip processor, logic gate configuration, firmware optionally associated with implementing logic such as an FPGA (Field Programmable Gate Array), or any other electronic device, system or arrangement.

In some embodiments, the processing device 140 may be provided along with the sensor 130 and optionally the radiation source 120 as part of an integrated processing system that is purpose-built for use with the apparatus 100.

As mentioned above, at least the first and second optical fibre portions 111, 112 are coupled to the body 101, such that they will undergo strains corresponding to underlying strains of the portion of the body 101 to which the optical fibre portions 111, 112 are coupled. In some embodiments, the optical fibre portions 111, 112 are coupled to respective surfaces of the body 101 using an adhesive. In other embodiments, the optical fibre portions 111, 112 might be directly embedded is the body 101, particularly if the body 101 is formed from a composite material.

Although the optical fibre portions 111, 112 may be simply coupled to an outer surface of the body 101, this might leave the optical fibre 110 prone to damage in some applications, and accordingly, in some examples, at least the first and second optical fibre portions 111, 112 may be coupled to the body 101 in a channel defined in the surface of the body 101. In some examples, the channel may be defined in a pattern across the surface of the body 101 to at least the portion of the optical fibre 110 arranged on the body 101 to be recessed inside the channel. Accordingly, only the extended length(s) of the optical fibre 110 for connections to the radiation source 120 and/or sensor 130 might protrude from the channel. It will be appreciated that other forms of local relief of material of the body 101 immediately beneath or around the optical fibre portions may be used. Alternatively, at least a portion of the optical fibre 110 may be covered by a coating applied to the body 101.

In other embodiments, at least the optical fibre portions 111, 112 may be integrally formed with the body 101. For example, the body 101 may be formed from a composite material including wound fibres, such as glass or carbon fibres, which are wound and bound with a resin or the like. One or more portions of the optical fibre 110 including the optical fibre portions 111, 112 may be incorporated with the windings to thereby embed the optical fibre portions 111, 112 in the composite structure of the body 101.

It will be appreciated that the examples above generally depict looped arrangements in which the optical fibre 110 is looped around the body 101 to define first and second fibre lengths extending across the body 101 from a looped fibre portion, the first fibre length extending at the first angle $\alpha_1$ and including the first strain sensitive optical fibre portion 111, and the second fibre length extending at the second angle $\alpha_2$ and including the second strain sensitive optical fibre portion 112. However, it should be understood that other arrangements are possible.

Figures 6, 7:
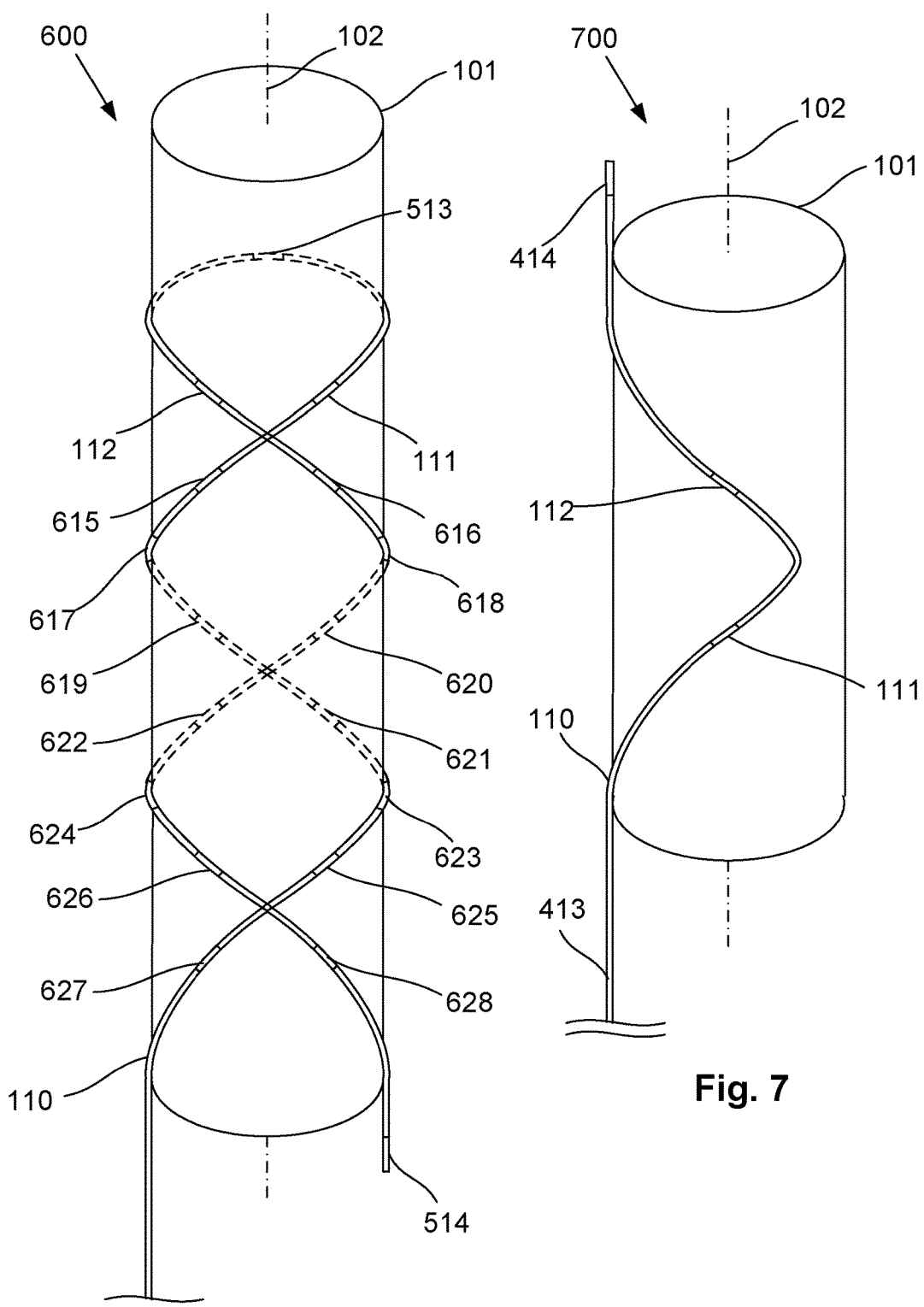
FIG. 6 is a schematic diagram of a third example of apparatus for measuring deformation of a body.
FIG. 7 is a schematic diagram of a fourth example of apparatus for measuring deformation of a body.

In some examples, such as the embodiment of the apparatus 600 shown in FIG. 6, greater numbers of strain sensitive optical fibre portions may be coupled to the body, such as by providing the optical fibre 110 in a coiled arrangement in which a plurality of strain sensitive optical fibre portions are aligned with each of the first and the second angle. In this example, strain sensitive optical fibre portions 111, 615, 617, 619, 621, 623, 625 and 627 are aligned with the first angle along a first helically wound portion of the optical fibre 110, and strain sensitive optical fibre portions 112, 616, 618, 620, 622, 624, 626 and 628 are aligned with the second angle along a second helically wound portion of the optical fibre 110, which is wound about the body 101 in an opposite direction compared to the first helically wound portion.

In other words, the optical fibre 110 may be arranged in a dual helix arrangement in which the optical fibre 110 is looped around the body 101 to define first and second helical aspects at least partially wound around the body 101 in opposing winding directions, the first helical aspect including the first strain sensitive optical fibre portion 111, and the second helical aspect including the second strain sensitive optical fibre portion 112. Each helical aspect may include a plurality of windings and a plurality of strain sensitive optical fibre portions It will be appreciated that the use of additional strain sensitive optical fibre portions, provided at different positions around the body 101, can allow further information regarding the deformation of the body 101 to be determined. For example, suitably placed strain sensitive optical fibre portions may allow bending deformations to be determined along with axial and torsional deformations. Furthermore, axial and torsional deformations at different positions along a length of the body 101 may also be determined, providing improved resolution for determining variations of deformations of the body 101, such as due to high localised loadings in particular parts of the body 101.

In an alternative embodiment of the apparatus 600 the helical wound portion of the fibre 110 might be coupled to the body 101 with a variable pitch arrangement. In other words, different ones of the windings may have different pitch angles to thereby align strain sensitive optical fibre portions at different angles. It will be appreciated that this results in strain sensitive optical fibre portions with different sensitivity responses and therefore allows the development of a highly sensitive wide range deformation measurement device. Accordingly, in some preferred examples, the optical fibre 110 may include a plurality of pairs of first and second strain sensitive optical fibre portions aligned at different respective first and second angles, in order to provide a number of effective sensors with different effective sensitivities in the same optical fibre 110.

It should also be understood that the particular arrangement of the optical fibre 110 in relation to the body 101 can vary provided at least the first and second strain sensitive optical fibre portions 111, 112 are provided with the required angular alignments relative to the axis 102. Accordingly, whilst the Figures discussed above show the optical fibre 110 provided in a looped or helically coiled arrangement relative to the body 101, this is not essential and other arrangements of the optical fibre 110 may be used to provide similar functionality as discussed above.

In this regard, FIG. 7 shows an example in which the optical fibre 110 is bent between the first and second strain sensitive optical fibre portions 111, 112 so as to define portions aligned with the opposite first and second angles without requiring looping of the optical fibre 110 around the body 101 or crossing segments of the optical fibre 110. In other words, in a bent arrangement, the optical fibre 110 runs along the body 101 and is bent to define first and second fibre lengths extending from a bent portion, the first fibre length extending at the first angle $\alpha_1$ and including the first strain sensitive optical fibre portion 111, and the second fibre length extending at the second angle $\alpha_2$ and including the second strain sensitive optical fibre portion 112.

In another example, the optical fibre 110 may be provided in a wrapped arrangement as shown in FIGS. 8A and 8B, in which the optical fibre 110 is wrapped circumferentially around the body 101 and includes a wave defining rising and falling fibre lengths, the rising fibre length including the first strain sensitive optical fibre portion 111, and the falling fibre length including the second strain sensitive optical fibre portion 112.

As can be better appreciated in FIG. 8B, the first and second strain sensitive optical fibre portions 111, 112 may be located in the rising and falling fibre lengths respectively in a generally mirrored arrangement, so that the first and second strain sensitive optical fibre portions 111, 112 are aligned at opposing first and second angles $\alpha_1$, $\alpha_2$. The first extended length 113 and the second extended length 114 may extend away from the body 101 from the same position. In some applications, where a large elongation of the body 101 is expected, it may be desirable to use such a wave-shaped arrangement rather than a looped or helical arrangement as discussed above to mitigate high strains in parts of the optical fibre 110 in use.

In extensions of this wrapped arrangement, the optical fibre 110 may include a plurality of waves within the same circumferential wrap around the body 101, each wave defining respective rising and falling fibre lengths having respective strain sensitive optical fibre portions 111, 112. In some embodiments, different ones of the waves may include respective rising and falling fibre lengths having different slope angles to thereby align strain sensitive optical fibre portions at different angles. This can facilitate measurements with different sensitivities at the same longitudinal position along the body 101.

An example of an optical fibre 900 having three waves with different slope angles is shown in FIG. 9, in an unwrapped configuration (i.e. removed from the body 101 and flattened into a planar arrangement whilst retaining the wave geometry). A first wave on the left of the optical fibre 900 as depicted includes a first pair of strain sensitive optical fibre portions 911, 912 on its rising and falling fibre lengths to define a first effective sensor A. The strain sensitive optical fibre portions 911, 912 are aligned at first and second angles $\alpha_{1A}$, $\alpha_{2A}$ and undergo tensile strains $S_{1A}$, $S_{2A}$. In a similar manner, a second wave on the centre of the optical fibre 900 includes a second pair of strain sensitive optical fibre portions 913, 914 on its rising and falling fibre lengths to define a second effective sensor B. The strain sensitive optical fibre portions 913, 914 are aligned at first and second angles $\alpha_{1B}$, $\alpha_{2B}$ and undergo tensile strains $S_{1B}$, $S_{2B}$. Finally, a third wave on the right of the optical fibre 900 as depicted includes a third pair of strain sensitive optical fibre portions 915, 916 on its rising and falling fibre lengths to define a third effective sensor C. The strain sensitive optical fibre portions 915, 916 are aligned at first and second angles $\alpha_{1C}$, $\alpha_{2C}$ and undergo tensile strains $S_{1C}$, $S_{2C}$.

The sensitivity of each sensor is a function of its slope angle. As can be seen, the first wave on the left defines relatively shallow angles $\alpha_{1A}$, $\alpha_{2A}$ with respect to the axis, the second wave in the centre defines intermediate angles $\alpha_{1B}$, $\alpha_{2B}$, whilst the third wave on the right defines relatively steep angles $\alpha_{1C}$, $\alpha_{2C}$.

Poisson's ratio can be used to determine the deformation of the rod's cross-section under compressive load. It will be appreciated that when a cylindrical body 101 is compressed, it will expand in diameter. When investigating the effects of the length-wise compression and the diameter expansion a slope angle can be found under which the two effects compensate each other and the optical fibre 110 won't see any strain. Accordingly, sensor B with the intermediate slope angle is set up in such a way, that it is insensitive to compression. In this example, the second wave is configured so that its respective pair of strain sensitive optical fibre portions 913, 914 is aligned with angles $\alpha_{1B}$, $\alpha_{2B}$ which are selected so that transverse and axial strain will cancel out in accordance with Poisson's ratio for the material of the body 101 and the geometry of the body 101, to thereby counteract the Poisson effect.

The first wave is configured so that its respective pair of strain sensitive optical fibre portions 911, 912 is aligned with angles $\alpha_{1A}$, $\alpha_{2A}$ that are offset from the angles $\alpha_{1B}$, $\alpha_{2B}$ by a predetermined offset angle. The relatively small angle with respect to the axis is expected to result in the first effective sensor A having lower sensitivity to torsional strains. Conversely, the third wave is configured so that its respective pair of strain sensitive optical fibre portions 915, 916 is aligned with angles $\alpha_{1C}$, $\alpha_{2C}$ that are offset from the angles $\alpha_{1B}$, $\alpha_{2B}$ by the predetermined offset in the opposite direction than for the first wave. The relatively large angle with respect to the axis is expected to result in the third effective sensor C having greater sensitivity to torsional strains.

Illustrative examples of strain indicators indicative of the strain responses of the three effective sensors A, B and C provided by the three waves of the optical fibre 900 of FIG. 9 will now be described with respect to FIGS. 10A-10C, 11A-11C and 12A-12C. The optical fibre 900 of FIG. 9 was applied to a body 101 in the form of a cylindrical rod, which was subjected to torque and compression loading in a rod testing rig, and strain responses were measured and analysed with regard to the applied loading. It should be noted that whilst these plots show strain indicators based on shifts in characteristic wavelengths for each strain sensitive optical fibre portion 911, 912, 913, 914, 915, 916 will refer directly to strains as indicated in the plots for convenience of explanation.

Figure 10A:
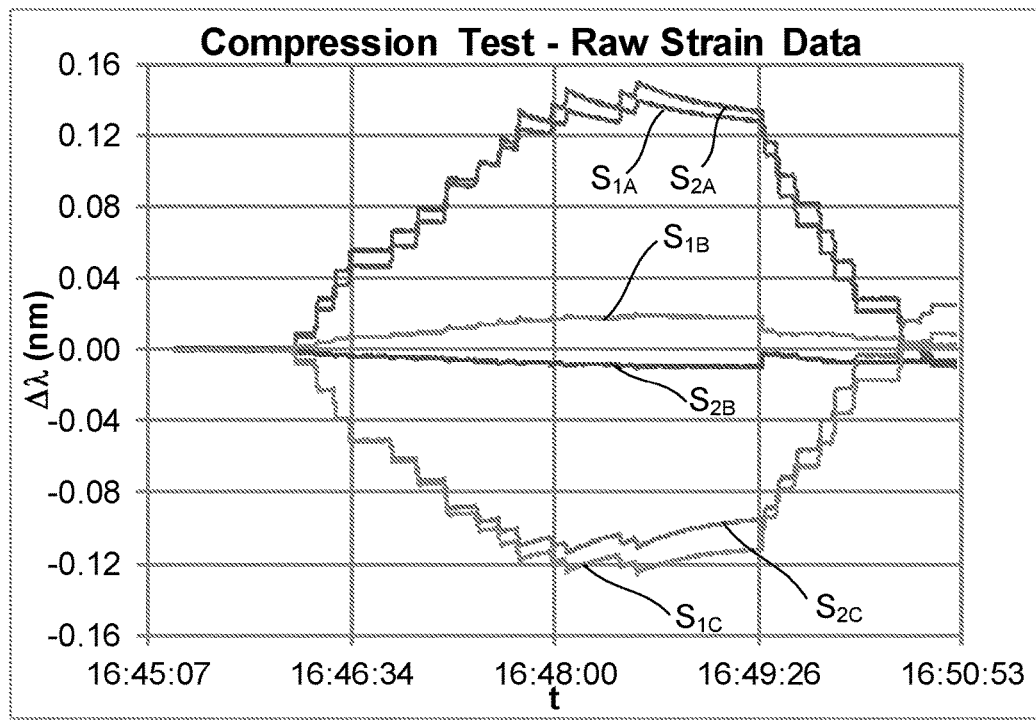
FIG. 10A is a plot of strain indicators under compression loading conditions applied to a cylindrical body provided with apparatus including the optical fibre of FIG. 9.
Figure 10B:
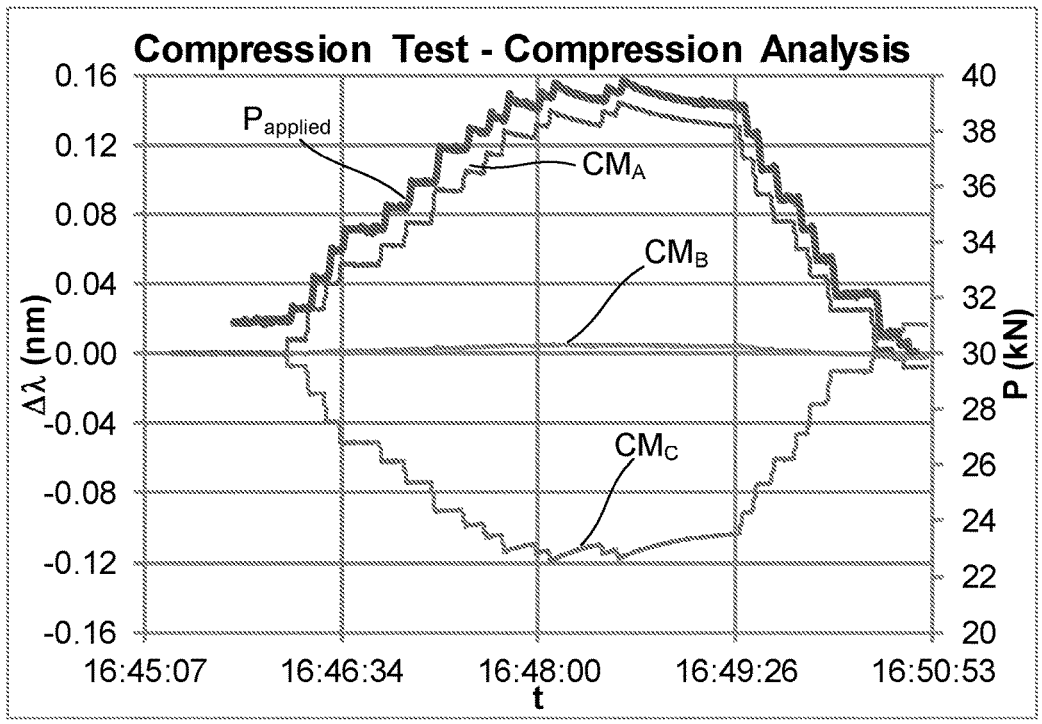
FIG. 10B is a plot of a compression analysis of the strain indicators of FIG. 10A.
Figure 10C:
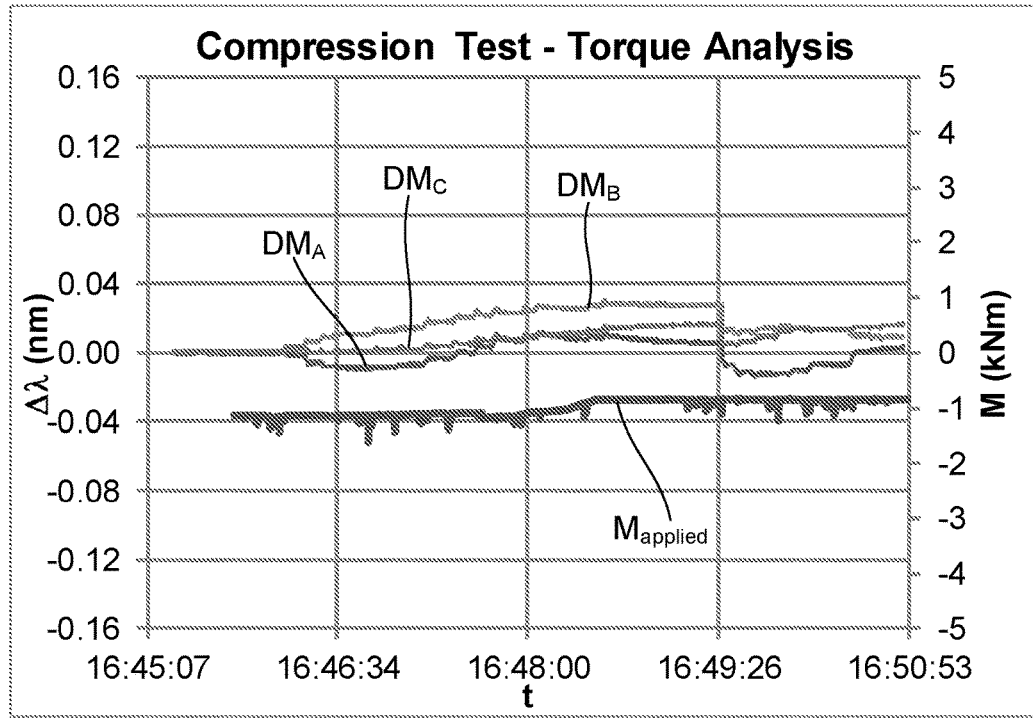
FIG. 10C is a plot of a torque analysis of the strain indicators of FIG. 10A.

FIGS. 10A-10C relate to a compression test of the optical fibre 900, in which the body 101 upon which the optical fibre 900 is arranged is subjected to an applied axial compression load $P_{applied}$.

With regard to FIG. 10A, which shows the strain results for each strain sensitive optical fibre portion 911, 912, 913, 914, 915, 916, the strains $S_{1A}$, $S_{2A}$ of the first effective sensor A are of similar magnitude and of positive sign. The strains $S_{1B}$, $S_{2B}$ of the second effective sensor B are near zero due to the selection of the angles $\alpha_{1B}$, $\alpha_{2B}$ to cancel out the Poisson effect as discussed above. The strains $S_{1C}$, $S_{2C}$ of the third effective sensor C are of similar magnitude and of negative sign.

FIG. 10B shows a compression analysis of the strain results of FIG. 10A, in which the common mode is determined for the strains of the respective pair of strain sensitive optical fibre portions for each effective sensor A, B, C. In this regard the common mode for sensor A is calculated as $CM_A=(S_{1A}+S_{2A})/2$, the common mode for sensor B is calculated as $CM_B=(S_{1B}+S_{2B})/2$, and the common mode for sensor C is calculated as $CM_C=(S_{1C}+S_{2C})/2$. The common mode responses may be compared against the actual applied axial loading $P_{applied}$. In particular, it will be seen that $CM_A$ correlates positively with $P_{applied}$ whilst $CM_C$ indicates a response that is substantially mirrored from $CM_A$. On the other hand, $CM_B$ is substantially zero as expected due to its selected angle.

FIG. 10C shows a torque analysis of the strain results of FIG. 10A, in which the differential is determined for the strains of the respective pair of strain sensitive optical fibre portions for each effective sensor A, B, C. In this regard the differential for sensor A is calculated as $DM_A=(S_{1A}-S_{2A})$, the differential for sensor B is calculated as $DM_B=(S_{1B}-S_{2B})$, and the differential for sensor C is calculated as $DM_C=(S_{1C}-S_{2C})$. The differential responses may be compared against the actual applied torque loading $M_{applied}$. Since the applied loading was compressive, there were no actual applied torques and the trace for $M_{applied}$ indicates a steady state error offset. In any event, the differentials $DM_A$, $DM_B$, $DM_C$ are negligible and indicate that the sensors A, B and C are not detecting any substantial torsional deformation.

Figure 11A:
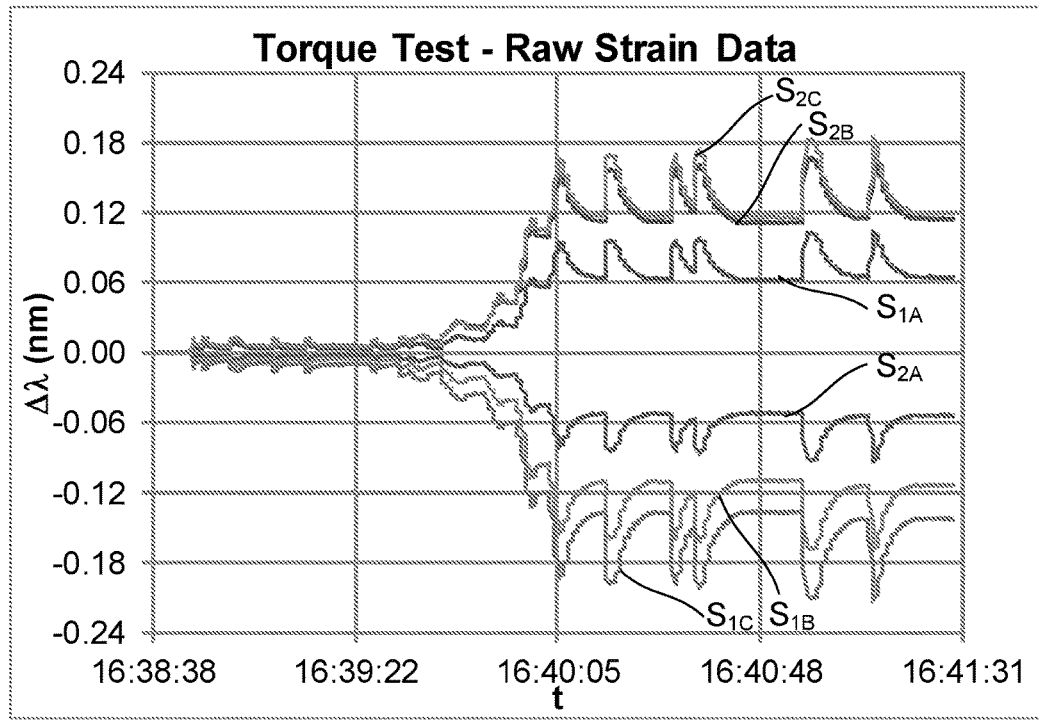
FIG. 11A is a plot of strain indicators under torque loading conditions applied to a cylindrical body provided with apparatus including the optical fibre of FIG. 9.
Figure 11B:
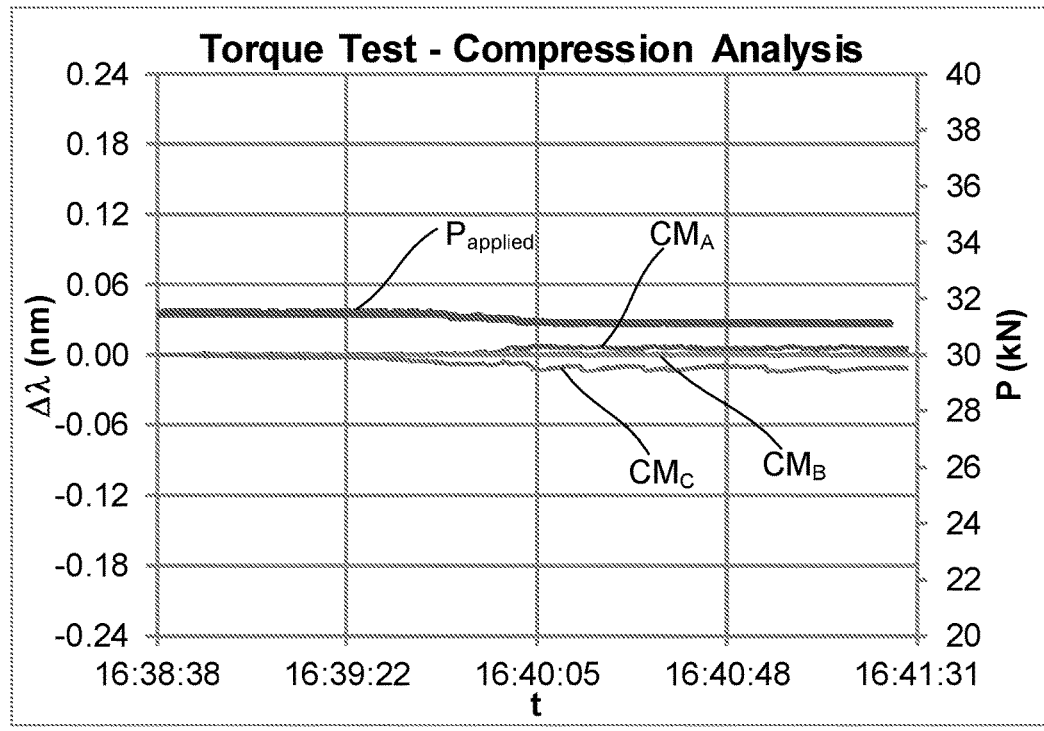
FIG. 11B is a plot of a compression analysis of the strain indicators of FIG. 11A.
Figure 11C:
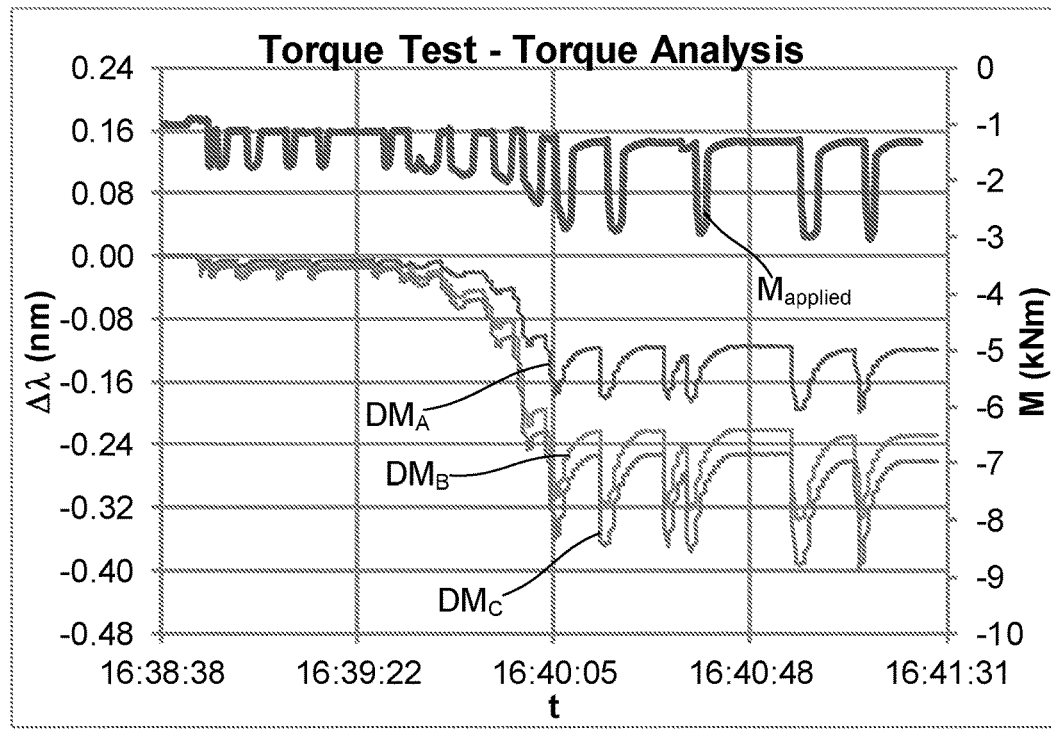
FIG. 11C is a plot of a torque analysis of the strain indicators of FIG. 11A.

FIGS. 11A-11C relate to a torque test of the optical fibre 900, in which the body 101 is subjected to an applied torque load $M_{applied}$. It is noted that the particular testing rig was only capable of applying pulsed torque loading, leading to the apparently pulsating response curves.

FIG. 11A shows the strain results for each strain sensitive optical fibre portion 911, 912, 913, 914, 915, 916. As can be seen, each sensor's pair of strain sensitive optical fibre portions has generally equal and opposing strain responses. The strains $S_{1A}$, $S_{2A}$ of the first effective sensor A, the strains $S_{1B}$, $S_{2B}$ of the second effective sensor B and the strains $S_{1C}$, $S_{2C}$ of the third effective sensor C are each of similar magnitude and of opposite sign with respect to one another.

FIG. 11B shows a compression analysis of the strain results of FIG. 11A, based on the common mode for each effective sensor A, B, C as discussed above for FIG. 10B. Since the applied loading was torsional, there was no applied compression and the trace for $P_{applied}$ indicates a steady state error offset. In any event, the common modes $CM_A$, $CM_B$, $CM_C$ are negligible in this case and indicate that the sensors A, B and C are not detecting substantial axial deformation.

FIG. 11C shows a torque analysis of the strain results of FIG. 11A, based on the differential for each effective sensor A, B, C as discussed above for FIG. 10C. The differential responses may be compared against the actual applied torque loading $M_{applied}$. In particular, it will be seen that each of $DM_A$, $DM_B$, $DM_C$ correlates positively with $M_{applied}$, with the magnitude of the differential response being higher for sensors B and C due to their progressively larger angles relative to the axis of the body, thus providing progressively enhanced sensitivity to torsional deformation.

Figure 12A:
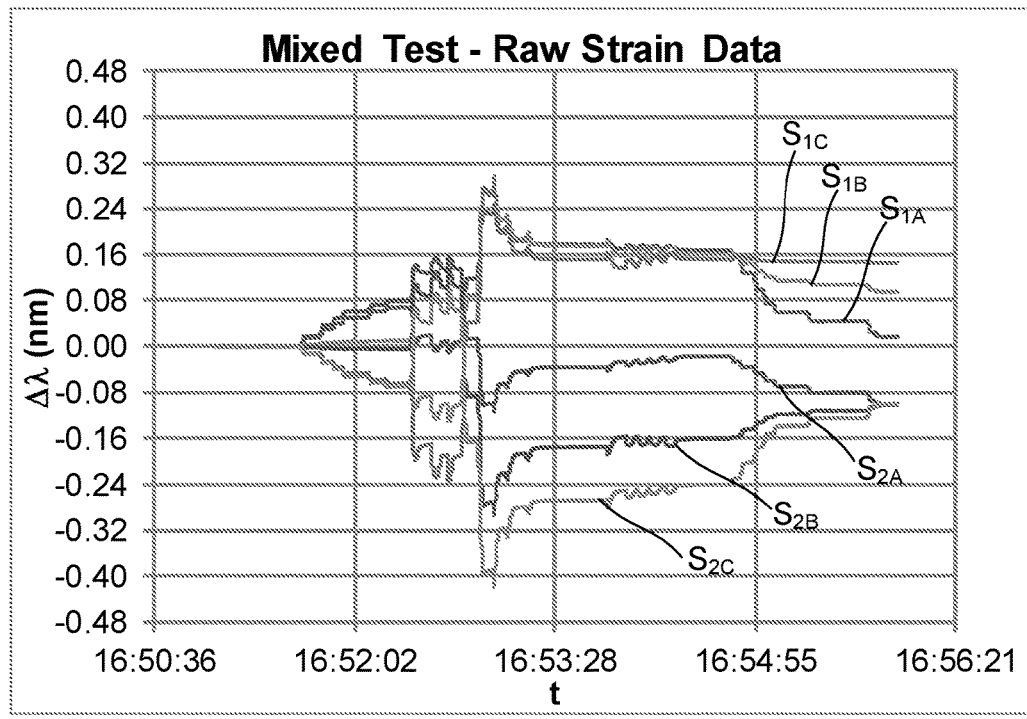
FIG. 12A is a plot of example strain indicators under mixed loading conditions applied to a cylindrical body provided with apparatus including the optical fibre of FIG. 9.
Figure 12B:
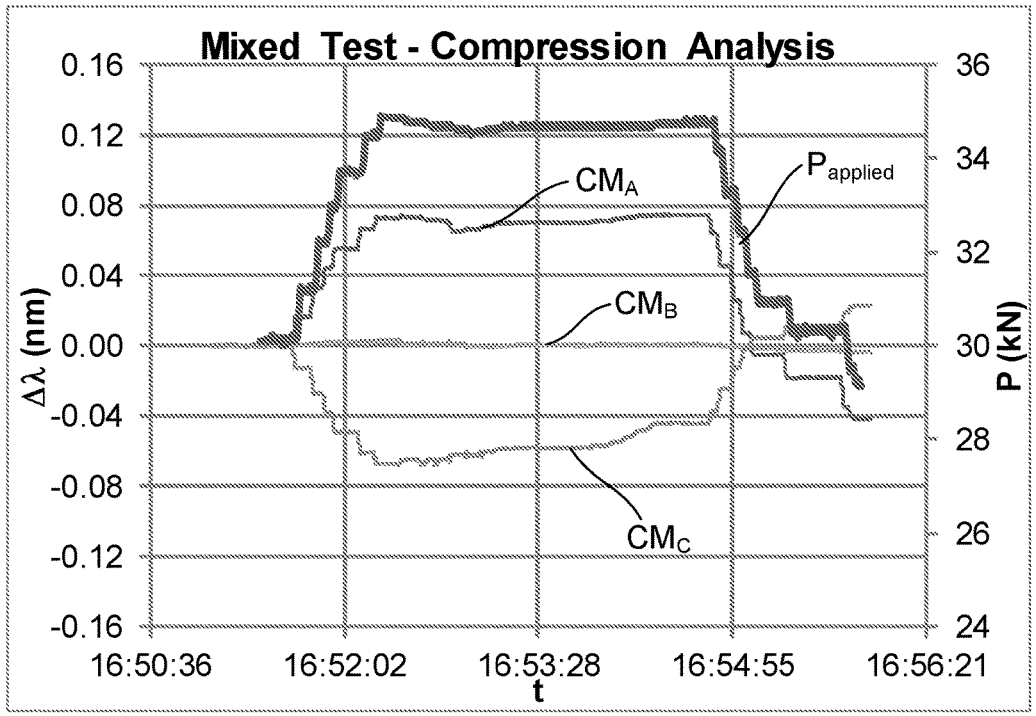
FIG. 12B is a plot of a compression analysis of the strain indicators of FIG. 12A; and, FIG. 12C is a plot of a torque analysis of the strain indicators of FIG. 12A.
Figure 12C:
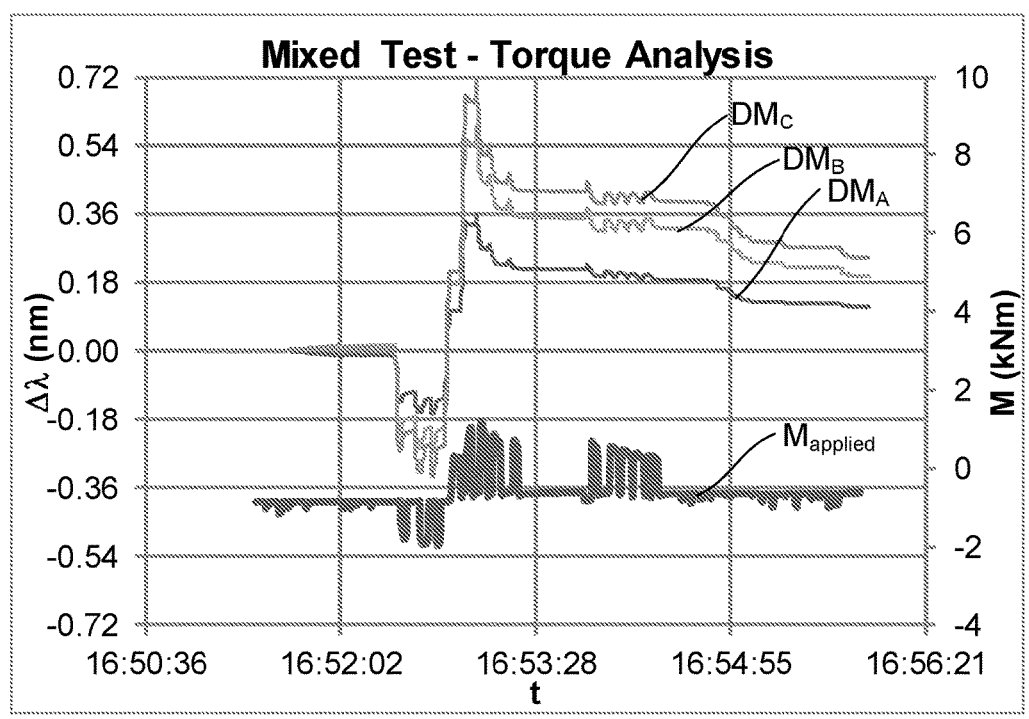

Finally, FIGS. 12A-12C relate to a mixed loading test of the optical fibre 900, in which the body 101 is subjected to a mixture of an applied compression load $P_{applied}$ and applied torque load $M_{applied}$.

FIG. 12A shows the strain results for each strain sensitive optical fibre portion 911, 912, 913, 914, 915, 916. Each sensor's pair of strain sensitive optical fibre portions provides a mirrored and offset strain response, reflecting the different contributions of axial and torsional deformations to the strains. These can be distinguished in the compression analysis and torque analysis as shown in FIGS. 12B and 12C.

FIG. 12B shows a compression analysis of the strain results of FIG. 12A, based on the common mode for each effective sensor A, B, C as discussed above for FIGS. 10B and 11B. The compressive load $P_{applied}$ has resulted in common mode responses which are similar to those discussed above for the pure compression example shown in FIG. 10B, in which $CM_A$ correlates positively with $P_{applied}$, $CM_C$ correlates negatively with $P_{applied}$, and $CM_B$ is substantially zero.

FIG. 12C shows a torque analysis of the strain results of FIG. 12A, based on the differential for each effective sensor A, B, C as discussed above for FIGS. 10C and 11C. The torque load $M_{applied}$ has resulted in differential responses which are similar to those discussed above for the pure torque example shown in FIG. 11C, in which each of $DM_A$, $DM_B$, $DM_C$ correlates positively with $M_{applied}$ with sensors B and C having greater sensitivity to torsion due to their larger angles relative to the axis.

It will therefore be appreciated that the axial and torsional deformation of the body 101 can be determined separately in a mixed loading scenario by conducting common mode and differential analyses on the respective strain responses of a pair of strain sensitive optical fibre portions 111, 112 aligned with opposing angles on the body 101. As will be appreciated from the plots described above, it is possible to calibrate the strain responses based on known loading to thereby allow the strain responses to represent different applied loading.

Whilst a cylindrical body 101 is shown in the Figures, it should be understood that the principles as discussed above may also be applied to other forms of elongate bodies, such as square or rectangular prisms, for example. In some cases, the optical fibre 110 may be arranged on one face of a prismatic body 101, to avoid the need for the optical fibre 110 to traverse corners of the body 101 which may be problematic due to minimum bend radius properties of the optical fibre 110.

In some embodiments, the body 101 may be fabricated from a metal such as kovar or invar in order to reduce the effect of thermal expansion on the measured strains, although this becomes less critical when the third and/or fourth strain sensitive optical fibre portions 415, 416 are used to compensate for temperature induced strains.

The particular magnitude of the first and second angles $\alpha_1$, $\alpha_2$ with which the first and second strain sensitive optical fibre portions 111, 112 are aligned is not particularly limited in the above examples, and it will be understood that the angles $\alpha_1$, $\alpha_2$ may be selected to determine the sensitivity of the apparatus to either axial or torsional deformations and the expected range of deformation. For example, shallower angles $\alpha_1$, $\alpha_2$ relative to the axis 101 may provide increased sensitivity to axial deformations at the expense of sensitivity to torsional deformations. However, such shallower angles $\alpha_1$, $\alpha_2$ might be required for bodies 101 having radial dimensions on a similar order as the minimum bend radius of the optical fibre 110. A reason for selecting a more profound angle would be if the expected axial deformation exceeds the tensile strength of the optical fibre 110.

In view of the above, it will be appreciated that embodiments of the apparatus allow for simultaneous measurement of torsional and axial strain of a body using a single optical fibre, and may optionally allow for measurement of temperature and other parameters using the same optical fibre.

In some embodiments, strain sensitive optical fibre portions are disposed about the body in a dual helix configuration. One aspect of the helix, in which a first strain sensitive optical fibre portion is provided, is coupled to the body in a right hand thread manner and a second aspect of the helix, in which a second strain sensitive optical fibre portion is provided, is coupled to the body in essentially the same location in a left hand thread manner. A loop between these helical aspects may optionally provide a third strain sensitive optical fibre portion. This third strain sensitive optical fibre portion may be mounted in such a way as to reduce the sensitivity resulting from strain applied to the cylinder.

Different applied loadings and resulting deformations will register as different strain-based responses in the strain sensitive optical fibre portions. For instance, an axial deformation due to an applied axial load will register a common mode response on the first and second strain sensitive optical fibre portions, and a torsional deformation to an applied moment will register a differential response on the first and second strain sensitive optical fibre portions. The third strain sensitive optical fibre portion will feel essentially neither positive or negative strain in these circumstances, although an increase in temperature applied to the body will register as an increase in apparent strain felt on the first, second and third strain sensitive optical fibre portions.

Hence, torsional deformations can be inferred by a differential changes in the strains registered in respective first and second strain sensitive optical fibre portions in the left and right-handed helical aspects, and axial deformations can be inferred by common mode changes in the strains for the left and right handed aspects, with the effect of temperature being detected and compensated for by removing the signal detected by the third strain sensitive optical fibre portion. Temperature can be independently inferred by changes seen in the third strain sensitive optical fibre portion in isolation to the detected signals recorded by the other strain sensitive optical fibre portions.

It will therefore be appreciated that such apparatus will be particularly useful for monitoring deformation of elongate bodies, such as deformations on a coiled tube drill assembly.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. Apparatus for measuring deformation of an elongate body defining an axis, the apparatus including:
   a) an optical fibre arranged relative to the body, the optical fibre including:
      i) a first strain sensitive optical fibre portion coupled to the body and at least partially aligned at a first angle relative to the axis; and,
      ii) a second strain sensitive optical fibre portion coupled to the body and at least partially aligned at a second angle relative to the axis, the second angle being opposite to the first angle relative to the axis, wherein the second strain sensitive optical fibre portion is a portion of the same optical fibre as the first strain sensitive optical fibre portion;
b) a radiation source connected to an end of the optical fibre, the radiation source being for supplying electromagnetic radiation to the optical fibre;
c) a sensor connected to an end of the optical fibre, the sensor being for sensing electromagnetic radiation received from the first and second strain sensitive optical fibre portions; and,
d) a processing device for determining the deformation of the body using the sensed electromagnetic radiation, the deformation including any axial or torsional deformation.

2. Apparatus according to claim 1, wherein the processing device determines deformation of the body by:
a) determining, using the sensed electromagnetic radiation:
 i) a first strain indicator indicative of a first strain on the first strain sensitive optical fibre portion; and,
 ii) a second strain indicator indicative of a second strain on the second strain sensitive optical fibre portion; and,
b) determining deformations of the body at least partially based on the first and second strain indicators.

3. Apparatus according to claim 2, wherein the processing device at least one of:
a) compares the first and second strain indicators to distinguish between axial and torsional deformations of the body;
b) determines that the body is undergoing an axial deformation based on a common mode response of the first and second strain indicators; and,
c) determines that the body is undergoing a torsional deformation based on a differential response of the first and second strain indicators.

4. Apparatus according to claim 1, wherein the optical fibre includes at least one of:
a) a third strain sensitive optical fibre portion that is thermally coupled to the body, wherein the processing device:
 i) determines, using the sensed electromagnetic radiation, a coupled temperature indicator indicative of a temperature of the third strain sensitive optical fibre portion; and,
 ii) determines a temperature of the body based on the coupled temperature indicator;
b) a fourth strain sensitive optical fibre portion that is mechanically and thermally decoupled from the body, wherein the processing device:
 i) determines, using the sensed electromagnetic radiation, a decoupled temperature indicator indicative of a temperature of the fourth strain sensitive optical fibre portion; and,
 ii) determines an ambient temperature based on the decoupled temperature indicator; and,
c) a plurality of pairs of first and second strain sensitive optical fibre portions aligned at different respective first and second angles.

5. Apparatus according to claim 4, wherein the processing device uses at least one temperature indicator to determine a temperature induced deformation of the body and determines axial and torsional deformation at least in part using the temperature induced deformation of the body.

6. Apparatus according to claim 1, wherein at least one of:
a) both the radiation source and the sensor are connected to a proximal end of the optical fibre; and,
b) the received electromagnetic radiation is at least one of transmitted and reflected electromagnetic radiation from the strain sensitive optical fibre portions.

7. Apparatus according to claim 1, wherein each strain sensitive optical fibre portion has a different optical response characteristic to thereby allow respective strain indicators to be determined for each strain sensitive optical fibre portion using the sensed electromagnetic radiation.

8. Apparatus according to claim 7, wherein each strain sensitive optical fibre portion includes a fibre Bragg grating, and wherein each fibre Bragg grating having a predetermined Bragg wavelength, such that the strain of the respective strain element can be determined based on a shift of the respective Bragg wavelength.

9. Apparatus according to claim 1, wherein each strain sensitive optical fibre portion includes a distributed strain sensitive element defined by the optical fibre.

10. Apparatus according to claim 9, wherein at least one of:
a) each strain sensitive optical fibre portion is provided by naturally occurring microstructures within the strain sensitive optical fibre portions having predetermined optical response characteristics;
b) each strain sensitive optical fibre portion generates a strain indicator in response to the supplied electromagnetic radiation by at least one of:
 i) Brillouin scattering;
 ii) Raman scattering; and,
 iii) Rayleigh scattering;
c) each strain sensitive optical fibre portion is provided by a continuous uniform grating; and,
d) the radiation source supplies a pulse of electromagnetic radiation and the processing device determines respective strain indicators for each strain sensitive optical fibre portion based on a pulse response time.

11. Apparatus according to claim 1, wherein the sensor senses the received electromagnetic radiation using at least one of:
a) interferometry;
b) spectroscopy; and,
c) backscattering.

12. Apparatus according to claim 1, wherein at least one of:
a) at least the first and second strain sensitive optical fibre portions are coupled to the body using an adhesive;
b) at least the first and second strain sensitive optical fibre portions are coupled to the body in a channel defined in a surface of the body; and,
c) at least the first and second strain sensitive optical fibre portions are integrally formed with the body.

13. Apparatus according to claim 1, wherein the optical fibre is looped around the body to define first and second fibre lengths extending across the body from a looped fibre portion, the first fibre length extending at the first angle and including the first strain sensitive optical fibre portion, and the second fibre length extending at the second angle and including the second strain sensitive optical fibre portion.

14. Apparatus according to claim 1, wherein the optical fibre is looped around the body to define first and second helical aspects at least partially wound around the body in opposing winding directions, the first helical aspect including the first strain sensitive optical fibre portion, and the second helical aspect including the second strain sensitive optical fibre portion.

15. Apparatus according to claim 1, wherein the optical fibre runs along the body and is bent to define first and second fibre lengths extending from a bent portion, the first fibre length extending at the first angle and including the first strain sensitive optical fibre portion, and the second fibre length extending at the second angle and including the second strain sensitive optical fibre portion.

16. Apparatus according to claim 1, wherein the optical fibre is wrapped circumferentially around the body and includes a wave defining rising and falling fibre lengths, the rising fibre length including the first strain sensitive optical fibre portion, and the falling fibre length including the second strain sensitive optical fibre portion.

17. Apparatus according to claim 16, wherein the optical fibre includes a plurality of waves, each wave defining respective rising and falling fibre lengths having respective strain sensitive optical fibre portions.

18. Apparatus according to claim 17, wherein different ones of the waves include respective rising and falling fibre lengths having different slope angles to thereby align strain sensitive optical fibre portions at different angles.

19. A method for measuring deformation of an elongate body defining an axis, the method including, in a processing device:
  a) determining, from a sensor connected to an end of an optical fibre, sensed electromagnetic radiation received from first and second strain sensitive optical fibre portions, the first strain sensitive optical fibre portion being coupled to the body and at least partially aligned at a first angle relative to the axis, and the second strain sensitive optical fibre portion being coupled to the body and at least partially aligned at a second angle relative to the axis, the second angle being opposite to the first angle relative to the axis, wherein the second strain sensitive optical fibre portion is a portion of the same optical fibre as the first strain sensitive optical fibre portion; and,
  b) determining deformation of the body using the sensed electromagnetic radiation, the deformation including any axial or torsional deformation.

20. A method for measuring deformation of a portion of tubing for use in a drilling operation, the method including, in a processing device:
  a) determining, from a sensor connected to an end of an optical fibre, sensed electromagnetic radiation received from first and second strain sensitive optical fibre portions, the first strain sensitive optical fibre portion being coupled to the portion of tubing and at least partially aligned at a first angle relative to an axis of the tubing, and the second strain sensitive optical fibre portion being coupled to the portion of tubing and at least partially aligned at a second angle relative to the axis of the tubing, the second angle being opposite to the first angle relative to the axis, wherein the second strain sensitive optical fibre portion is a portion of the same optical fibre as the first strain sensitive optical fibre portion; and,
  b) determining deformation of the portion of tubing using the sensed electromagnetic radiation, the deformation including any axial or torsional deformation.

\* \* \* \* \*